(12) United States Patent
Asai et al.

(10) Patent No.: US 9,921,319 B2
(45) Date of Patent: Mar. 20, 2018

(54) INFORMATION PROCESSING APPARATUS, CONTROL METHOD OF INFORMATION PROCESSING APPARATUS, RADIATION IMAGING SYSTEM, AND STORAGE MEDIUM

(71) Applicant: CANON KABUSHIKI KAISHA, Tokyo (JP)

(72) Inventors: Hiroki Asai, Kawasaki (JP); Toshiya Ishioka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 337 days.

(21) Appl. No.: 14/830,135

(22) Filed: Aug. 19, 2015

(65) Prior Publication Data

US 2016/0061970 A1    Mar. 3, 2016

(30) Foreign Application Priority Data

Sep. 2, 2014 (JP) ................................ 2014-178503

(51) Int. Cl.
| | |
|---|---|
| G06F 19/00 | (2011.01) |
| G01T 7/00 | (2006.01) |
| G01T 1/17 | (2006.01) |
| G01T 1/175 | (2006.01) |

(52) U.S. Cl.
CPC ............... G01T 7/005 (2013.01); G01T 1/17 (2013.01); G01T 1/175 (2013.01)

(58) Field of Classification Search
CPC ........... G06F 19/3406; A61B 2562/046; A61B 2562/02

USPC .......................................... 702/182–185, 188
See application file for complete search history.

(56) References Cited

U.S. PATENT DOCUMENTS 6,781,144 B2 * 8/2004 Yonekawa ............. G03B 42/04
250/581
7,944,478 B2 * 5/2011 Shiibashi ............... G06F 19/321
348/211.2

FOREIGN PATENT DOCUMENTS

JP       2008-000173       1/2008

* cited by examiner

*Primary Examiner* — Edward Raymond
(74) *Attorney, Agent, or Firm* — Fitzpatrick Cella Harper and Scinto

(57) ABSTRACT

An information processing apparatus connected to an external connection unit of a radiation imaging apparatus including a storage unit and a control unit configured to access to the storage unit, comprises a determination unit that determines that an abnormality has occurred in the radiation imaging apparatus; a processing unit that, if determined that the abnormality has occurred, and the control unit has access authority to the storage unit, performs processing of revoking the access authority; another control unit that obtains the access authority in accordance with the processing of the processing unit and accesses the storage unit; and an output unit that outputs, to an external apparatus, any one of radiation image data captured by the radiation imaging apparatus and log data of the apparatus which are obtained from the storage unit via the other control unit.

10 Claims, 25 Drawing Sheets

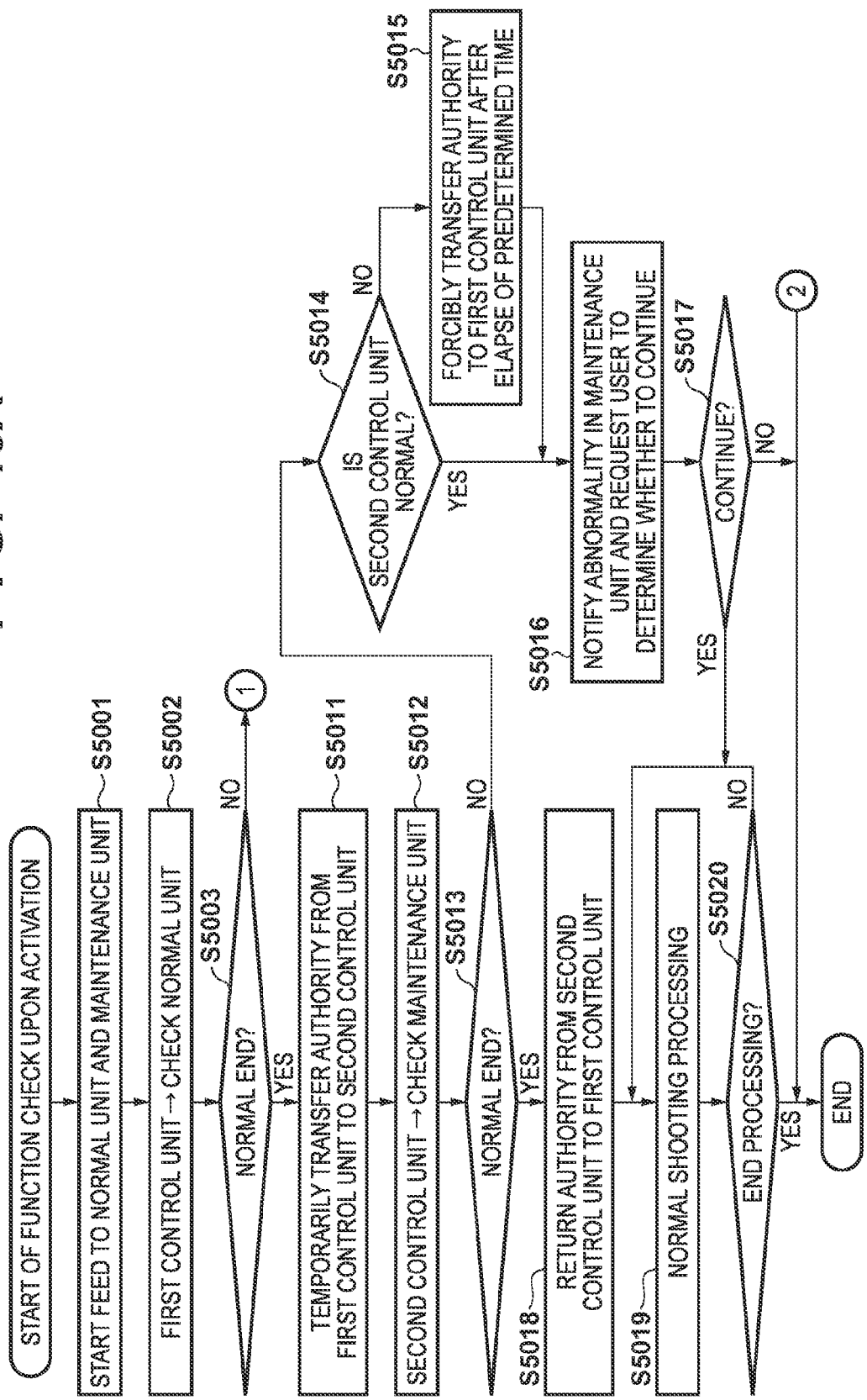

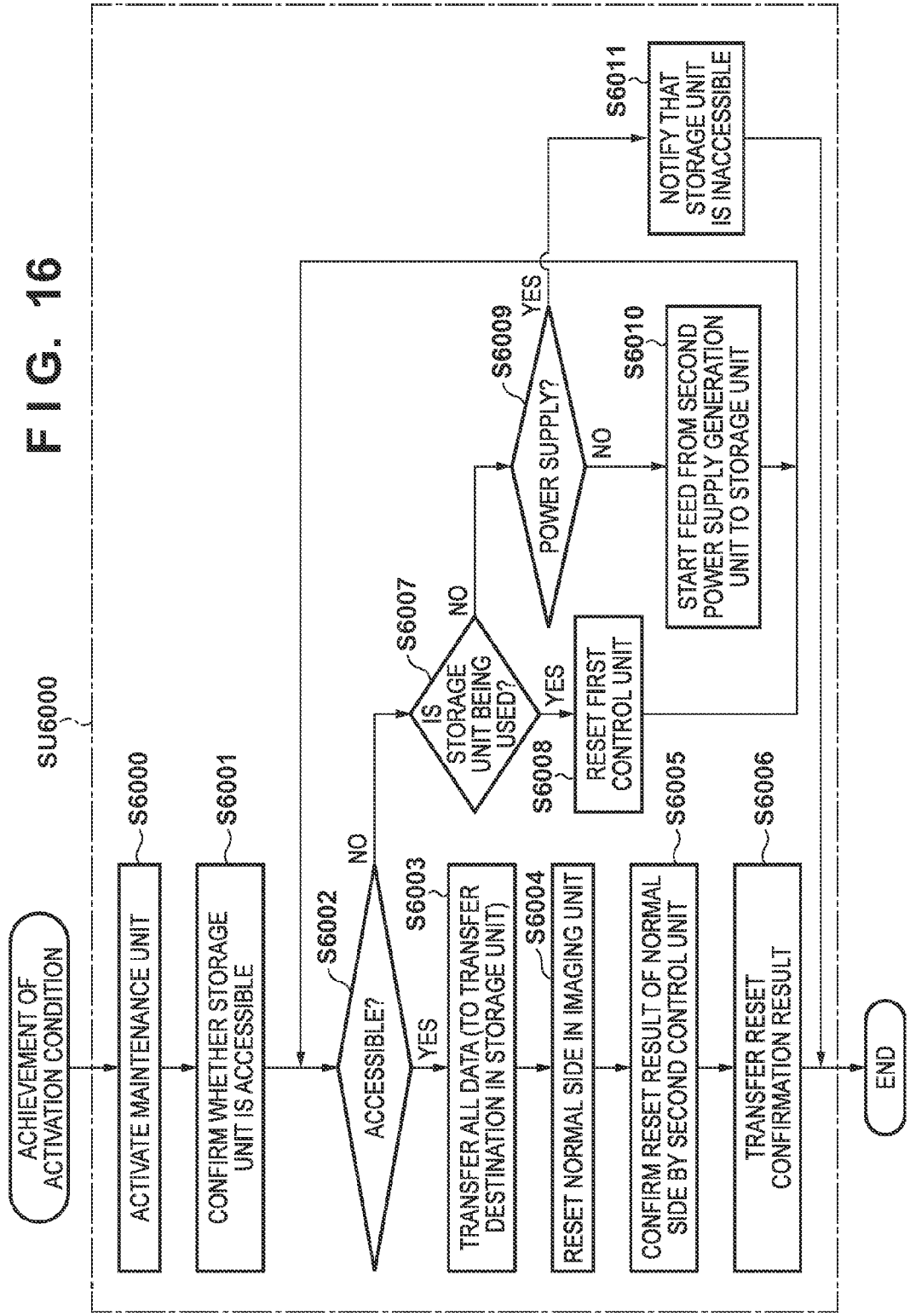

INFORMATION PROCESSING APPARATUS, CONTROL METHOD OF INFORMATION PROCESSING APPARATUS, RADIATION IMAGING SYSTEM, AND STORAGE MEDIUM

BACKGROUND OF THE INVENTION

Field of the Invention

The present invention relates to an information processing apparatus, a control method of the information processing apparatus, a radiation imaging system, and a storage medium.

Description of the Related Art

In recent years, a radiation imaging apparatus that generates a radiation image by directly digitizing radiation using a radiation sensor formed by adhering a phosphor to a solid-state image sensor for a wide screen, that is, a so-called flat panel detector (FPD) has been put into practical use. Such a radiation imaging apparatus employing the digital method is widely used as a replacement for a conventional radiation imaging apparatus using an analog method.

The radiation imaging apparatus can obtain the operation state of each unit of the apparatus or the like as log information and output it to the outside of the apparatus at a designated timing.

The maker or seller of the radiation imaging apparatus provides support such as repair and replacement of an apparatus that has failed. Upon receiving a notice about an apparatus failure and a repair request from medical staff such as a doctor or technician in a medical facility, the cause and portion of the failure are estimated based on the information of failure situation such as the above-described log information, and the apparatus or parts are repaired or replaced.

However, if a failure occurs in some functions of the radiation imaging apparatus, for example, a communication function used when outputting data to the outside of the apparatus or a control unit such as a CPU that generally controls internal processing, data obtaining or output to the outside of the apparatus becomes impossible. In such a situation, the time (downtime) during which the radiation imaging apparatus that has failed is unusable becomes long, and the diagnosis efficiency considerably lowers.

From this viewpoint, Japanese Patent Laid-Open No. 2008-000173 discloses a technique of supplying failure information such as log data representing the operation state of an apparatus whose power supply unit has failed to a service center that is in charge of maintenance of a medical diagnostic apparatus.

In Japanese Patent Laid-Open No. 2008-000173, however, although log information or the like is output to the outside of a medical diagnostic apparatus when its power supply unit has failed, no mention is made of failures of other functions. Hence, if a control unit such as a CPU has failed, it is difficult to extract data such as log information stored in the apparatus.

The present invention has been made in consideration of the above-described problem, and provides a technique of, even in a case where some functions such as a control unit of a radiation imaging apparatus have failed, extracting desired data from the radiation imaging apparatus in which the failure has occurred.

SUMMARY OF THE INVENTION

According to one aspect of the present invention, there is provided an information processing apparatus connected to an external connection unit of a radiation imaging apparatus including a storage unit and a control unit configured to access to the storage unit, comprising: a determination unit configured to determine that an abnormality has occurred in the radiation imaging apparatus; a processing unit configured to, in a case where the determination unit determines that the abnormality has occurred, and the control unit has access authority to the storage unit, perform processing of revoking the access authority; another control unit configured to obtain the access authority to the storage unit in accordance with the processing of the processing unit and access the storage unit; and an output unit configured to output, to an external apparatus, at least one of radiation image data captured by the radiation imaging apparatus and log data of the radiation imaging apparatus which are obtained from the storage unit via the other control unit.

Further features of the present invention will become apparent from the following description of exemplary embodiments with reference to the attached drawings.

BRIEF DESCRIPTION OF THE DRAWINGS

FIGS. 15A and 15B are flowcharts showing the procedure of function check processing upon activation executed by the radiation imaging apparatus according to the third embodiment;

FIG. 16 is a flowchart showing the procedure of check processing in a steady state executed by the radiation imaging apparatus according to the third embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<1. Arrangement of Radiation Imaging Apparatus>

Figure 1:
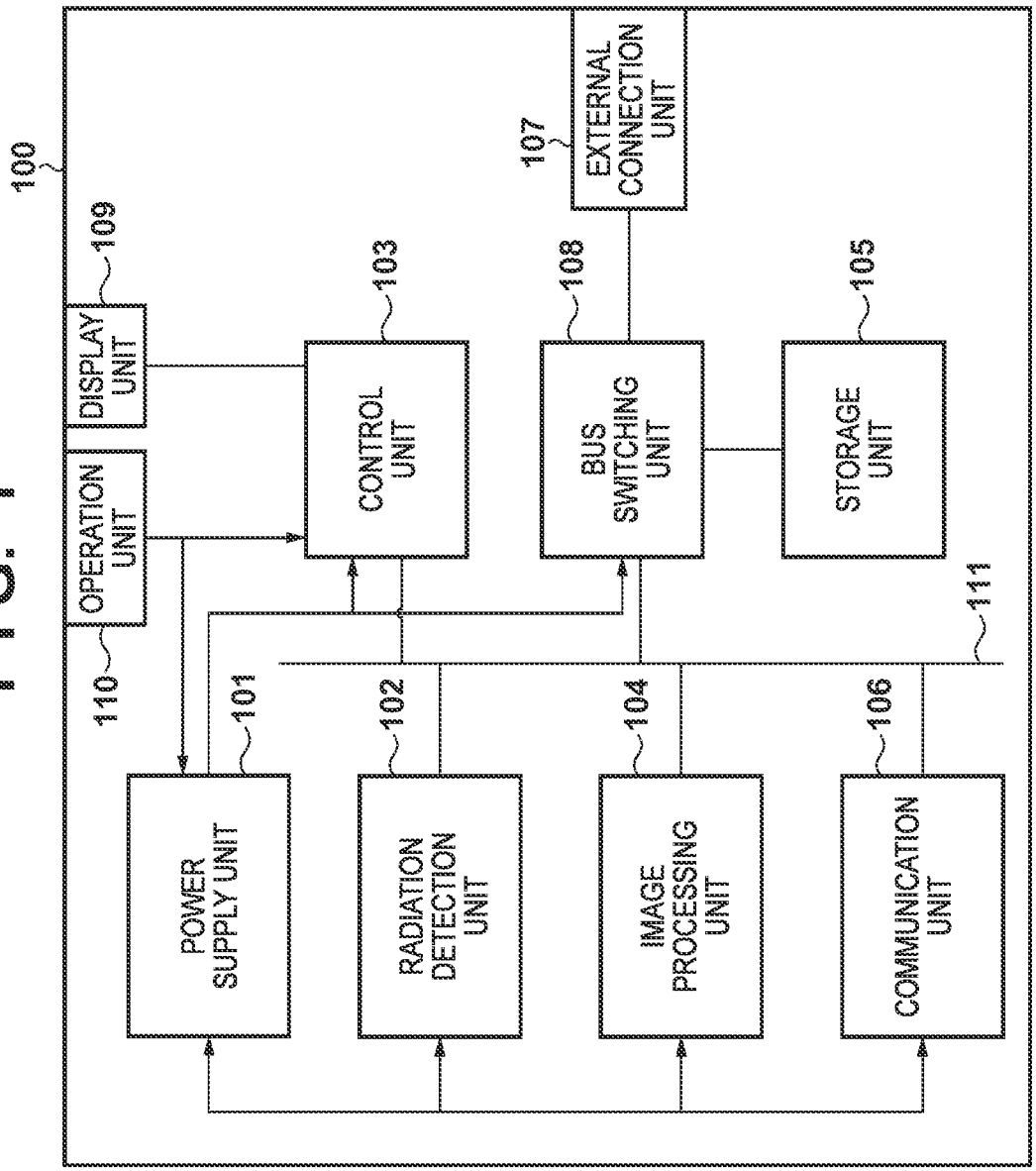
FIG. 1 is a block diagram showing an example of the arrangement of a radiation imaging apparatus according to the first embodiment.

FIG. 1 is a block diagram showing an example of the arrangement of a radiation imaging apparatus according to the first embodiment. The radiation imaging apparatus detects, by an image sensor, radiation (X-rays or the like) transmitted through an object, thereby obtaining image data (digital radiation image data) of the object.

A radiation imaging apparatus 100 includes a power supply unit 101, a radiation detection unit 102, a control unit 103, an image processing unit 104, a storage unit 105, a communication unit 106, an external connection unit 107, a bus switching unit 108, a display unit 109, and an operation unit 110. The processing units are connected by a bus 111.

The power supply unit 101 includes a battery and a power supply circuit (neither are shown). The power supply unit 101 generates power necessary for the processing units in the radiation imaging apparatus 100 and supplies it.

The radiation detection unit 102 includes a scintillator, a photodetector array, a driving circuit, and an A/D converter (none are shown). In the scintillator of the radiation detection unit 102, the matrix substance of a phosphor is excited by high-energy radiation transmitted through an object, and fluorescence in the visible region is obtained by recombination energy upon recombination. The fluorescence is caused by the matrix which may be $CaWO_4$ or $CdWO_4$ itself or a luminescence center substance such as CsI:Tl or ZnS:Ag added into the matrix. In accordance with the operation of the driving circuit, the photodetector array sequentially outputs an electrical signal corresponding to a fluorescence amount detected by the pixels of the photodetector array, that is, the amount of radiation that has entered the phosphor of the scintillator. The A/D converter digitizes the signal output from the photodetector array and outputs it.

The control unit 103 performs processing concerning control of each unit of the radiation imaging apparatus 100. For example, the control unit 103 performs processing such as issuing an instruction to the driving circuit of the radiation detection unit 102 or saving an obtained image in the storage unit 105. The control unit 103 also transmits image data or receives and processes a control signal via the communication unit 106, and switches between activation and stop of the radiation imaging apparatus 100 based on an operation from the operation unit 110. The control unit 103 can also notify the user of an operation state or error state via the display unit 109.

The image processing unit 104 performs various kinds of image processing for image data output from the radiation detection unit 102. An example of image processing is basic correction processing such as dark noise correction (offset correction) and gain correction to obtain low-noise radiation image data. Image processing such as image quality adjustment requested by the user, for example, tone correction may also be included.

The storage unit 105 includes one or a plurality of memories, and stores image data output from the radiation detection unit 102 or the image processing unit 104 and log information representing the result of internal processing or the like. When the control unit 103 executes the operation of each processing unit by reading out a program, the storage unit 105 stores the program. Detailed implementation is not limited, and various combinations are possible for one or a plurality of memories, HDDs, and volatile memories/nonvolatile memories.

The communication unit 106 is a communication module for a wireless LAN, wired LAN, or public line, and transfers log information and image data processed by the image processing unit 104 to the outside.

The external connection unit 107 is used when connecting to an external apparatus. When the radiation imaging apparatus is connected to an external apparatus, power supply and transmission/reception of control signals and data with respect to the storage unit 105 are performed between the radiation imaging apparatus and the external apparatus via the external connection unit 107.

The bus switching unit 108 switches the supply source of the power and signals to the storage unit 105 from the bus (path) 111 in the radiation imaging apparatus 100 to the external apparatus connected via the external connection unit 107.

The display unit 109 is used to notify the user of the state of the radiation imaging apparatus 100 and the like. The implementation method is not particularly limited, and the display unit 109 can be implemented by an LED, LCD, monitor, or the like. For example, when using LEDs, the user is notified of the internal state of the radiation imaging apparatus 100 by the ON/OFF combination of a plurality of LEDs or a combination of lighting methods (for example, lightning intervals). As a method of notification to the user, a speaker or the like may be provided.

The operation unit 110 is used to accept a user operation. The implementation method is not particularly limited, accepting an input from the user suffices. More specifically, the operation unit 110 can be implemented by various kinds of switches and a touch panel manually operated by the user.

<2. Arrangement of Maintenance Apparatus>

Figure 2:
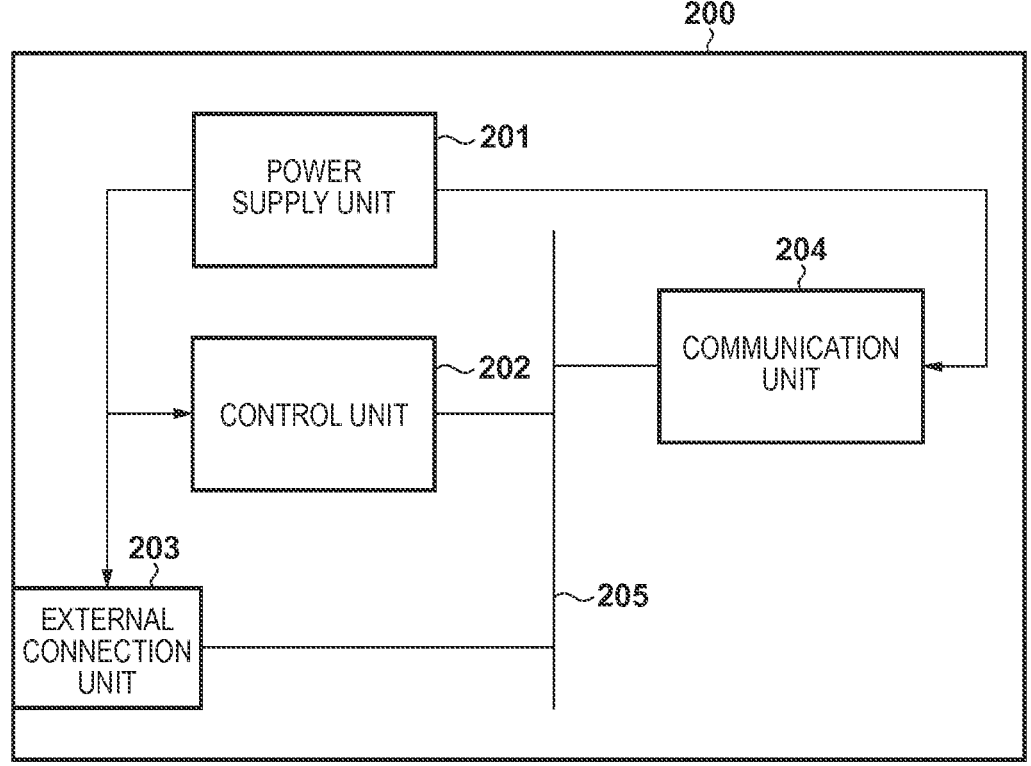
FIG. 2 is a block diagram showing an example of the arrangement of a maintenance apparatus according to the first embodiment.

FIG. 2 is a block diagram showing an example of the arrangement of a maintenance apparatus (information processing apparatus) for maintaining the radiation imaging apparatus according to the first embodiment. A maintenance apparatus 200 includes a power supply unit 201, a control unit 202, an external connection unit 203 connected to the radiation imaging apparatus 100, and a communication unit 204. The processing units are connected by a bus 205.

The power supply unit 201 includes a battery and a power supply circuit (neither are shown). The power supply unit 201 generates power necessary for the processing units in maintenance apparatus 200 and the storage unit 105 in the radiation imaging apparatus 100 and supplies it. The control unit 202 performs processing concerning control of each unit of the maintenance apparatus 200. The control unit 202 also has a function of accessing the storage unit 105 in the radiation imaging apparatus 100 connected to the maintenance apparatus 200 and reading out stored data.

The external connection unit 203 is used when connecting to the radiation imaging apparatus 100. Power supply and transmission/reception of control signals and data with respect to the storage unit 105 in the radiation imaging apparatus 100 are performed between the maintenance apparatus 200 and the radiation imaging apparatus via the external connection unit 203. The communication unit 204 is a communication module for a wireless LAN, wired LAN, or public line, and transfers information read out by the control unit 202 or stored in the storage unit 105 to the outside.

<3. Arrangement of Bus Switching Unit>

Figure 3:
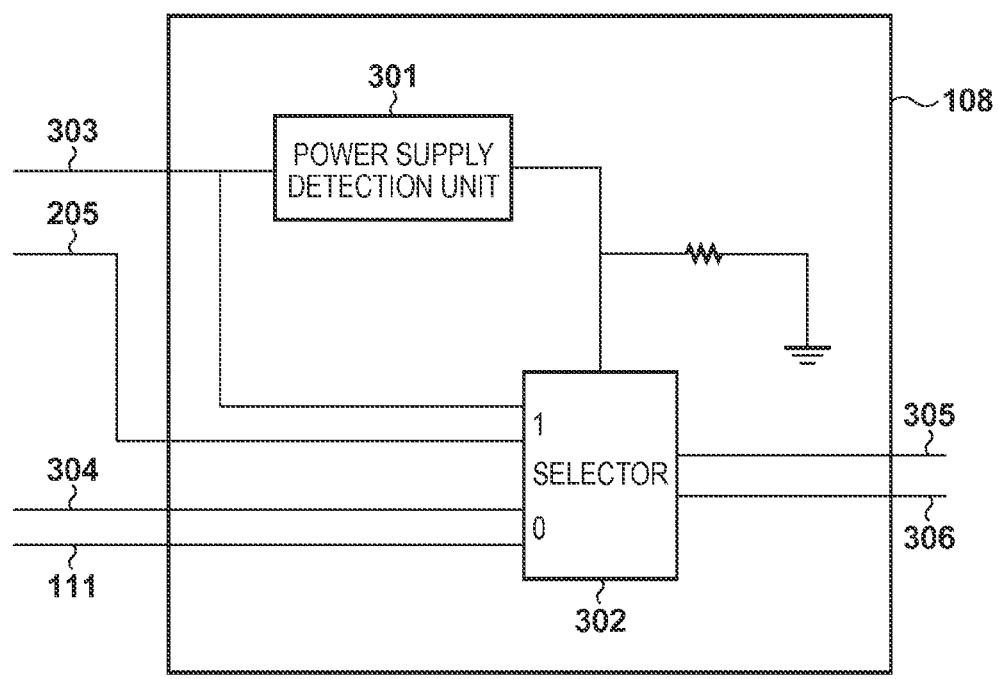
FIG. 3 is a block diagram showing an example of the arrangement of a bus switching unit according to the first embodiment.

FIG. 3 is a block diagram showing an example of the arrangement of the bus switching unit 108 included in the radiation imaging apparatus 100 according to the first embodiment. The bus switching unit 108 includes a power supply detection unit 301 and a selector 302. Power to the storage unit 105, which is generated by the power supply unit 201 of the maintenance apparatus 200, is input to the power supply detection unit 301 via a power supply line 303. Upon detecting input of power of a predetermined voltage value or more when the maintenance apparatus 200 is connected to the radiation imaging apparatus 100, the power supply detection unit 301 outputs a high-level signal. Normally, the output of the power supply detection unit 301 is pulled down to a low-level signal. The output signal from the power supply detection unit 301 is an input signal switching control signal to the selector 302. If the input signal switching control signal is a low-level signal, inputs from a power supply line 304 and the bus 111, which are supplied from the power supply unit 101, are output to a power supply line 305 and an output signal line 306, respectively.

If the input signal switching control signal is a high-level signal, inputs from the power supply line 303 and the bus 205, which are supplied from the power supply unit 201, are output the a power supply line 305 and the output signal line 306, respectively. Hence, when the maintenance apparatus 200 is not connected, the storage unit 105 receives the power supplied from the power supply unit 101 and accepts access from the control unit 103. On the other hand, when the maintenance apparatus 200 is connected, switching is made such that the storage unit 105 receives the power supplied from the power supply unit 201 and accepts access from the control unit 202.

<4. Example of Structure of Radiation Imaging Apparatus>

Figure 4:
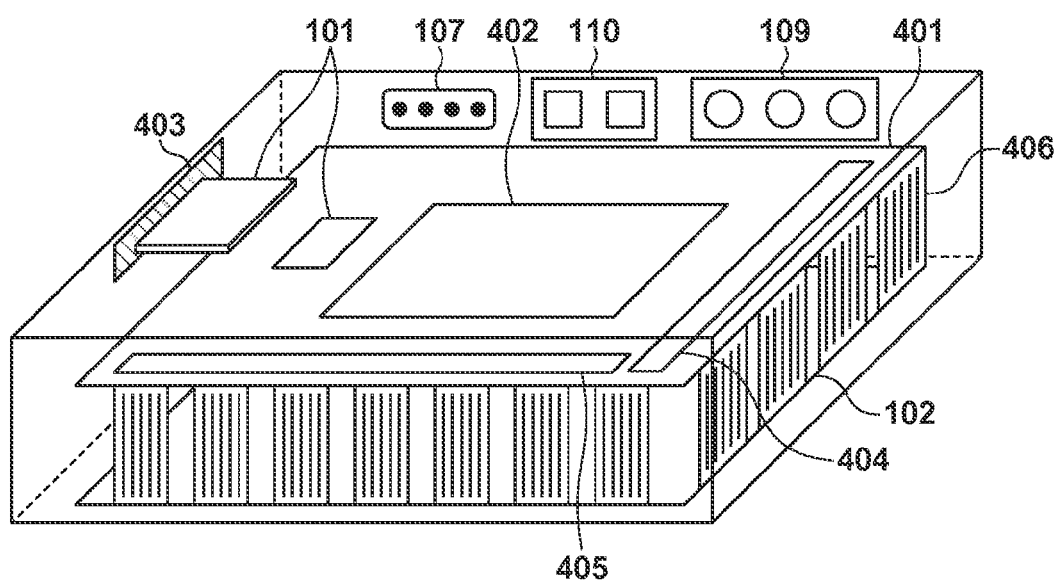
FIG. 4 is a perspective view showing an example of the structure of the radiation imaging apparatus according to the first embodiment.

FIG. 4 is a perspective view showing an example of the structure of the radiation imaging apparatus according to the first embodiment. FIG. 4 is a perspective view of the radiation imaging apparatus 100 viewed from a specific direction, and the same reference numerals as in FIG. 1 denote the same components in FIG. 4. The radiation imaging apparatus 100 is configured to have the processing units in a case. The size and material of the case are not particularly limited as long as it can store necessary processing units.

The operation unit 110, the display unit 109, and various kinds of external connection units 107 are arranged in the case so as to be accessible by the user. The operation unit 110 includes two switches operable by the user. The display unit 109 includes three LEDs that notify the user of a state. The external connection unit 107 is a connection unit used to connect the maintenance apparatus 200.

The planar radiation detection unit 102 is arranged in the case. A fixing panel 401 is arranged to face the radiation detection unit 102. The fixing panel 401 fixes the position of each unit in the radiation imaging apparatus 100. The power supply unit 101 is formed from a battery and a power supply circuit. The battery is detachable from an opening portion 403 formed in the case. The power supply circuit is arranged at a position capable of receiving power from the battery. In FIG. 4, the power supply circuit is arranged as one electric circuit board. A control board 402 is also arranged at one electric circuit board. The control unit 103, the image processing unit 104, the storage unit 105, the communication unit 106, and the bus switching unit 108 are incorporated in the control board 402 and operate in the control board 402.

An amplification unit 404 and a drive unit 405 are included in the driving circuit described as part of the radiation detection unit 102. The amplification unit 404 has a function of amplifying a signal output from the radiation detection unit 102. The drive unit 405 has a function of driving the photodetector array in the radiation detection unit 102.

A flexible board 406 is provided to transmit a signal from the radiation detection unit 102 to the amplification unit 404 and transmit a driving signal from the drive unit 405 to the radiation detection unit 102. The flexible board 406 mediates the signal exchange.

If the storage unit 105 out of the processing units of the radiation imaging apparatus 100 has failed, and the failure cannot recover, data to be output itself is lost, and therefore, outputting data is meaningless. On the other hand, if an unrecoverable failure has occurred in a processing unit other than the control unit 103 and the communication unit 106, it is possible to write abnormality contents in the log by operation confirmation of the control unit 103 and transfer the log information to the outside of the radiation imaging apparatus 100 via the communication unit 106 at a predetermined timing. However, if a failure has occurred in the control unit 103 or the communication unit 106, the log information cannot be transferred.

Figure 5:
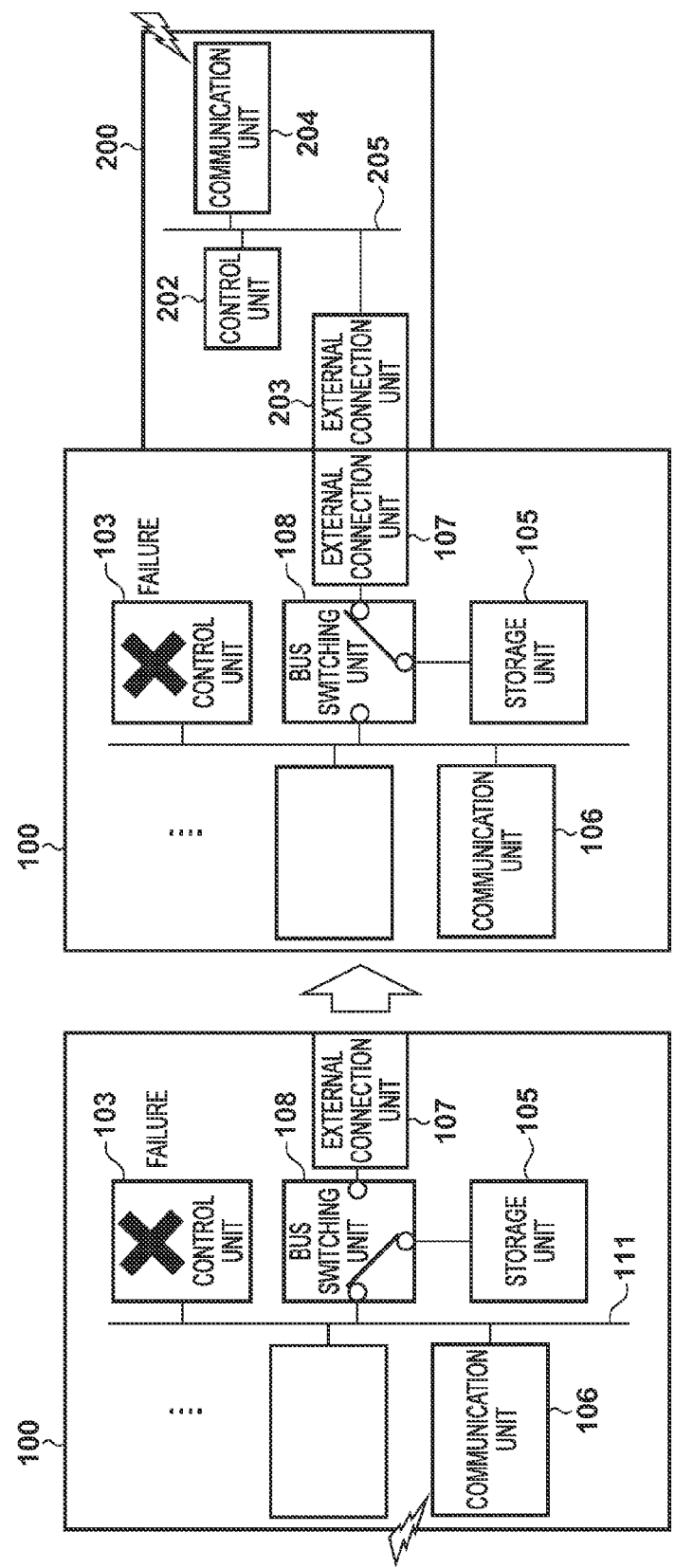
FIG. 5 is a schematic view showing an example of connection of the maintenance apparatus at the time of failure occurrence according to the first embodiment.

The maintenance apparatus 200 according to this embodiment enables readout of log information from the radiation imaging apparatus 100 even when a failure has occurred in the power supply unit 101, the control unit 103, or the communication unit 106. The procedure of processing of reading out data in the storage unit 105 by connecting the maintenance apparatus 200 to the radiation imaging apparatus 100 in a case where, for example, a failure has occurred in the control unit 103 of the radiation imaging apparatus 100, as shown in FIG. 5, will be described below in detail.

<5. Processing of Radiation Imaging Apparatus>

Figure 6:
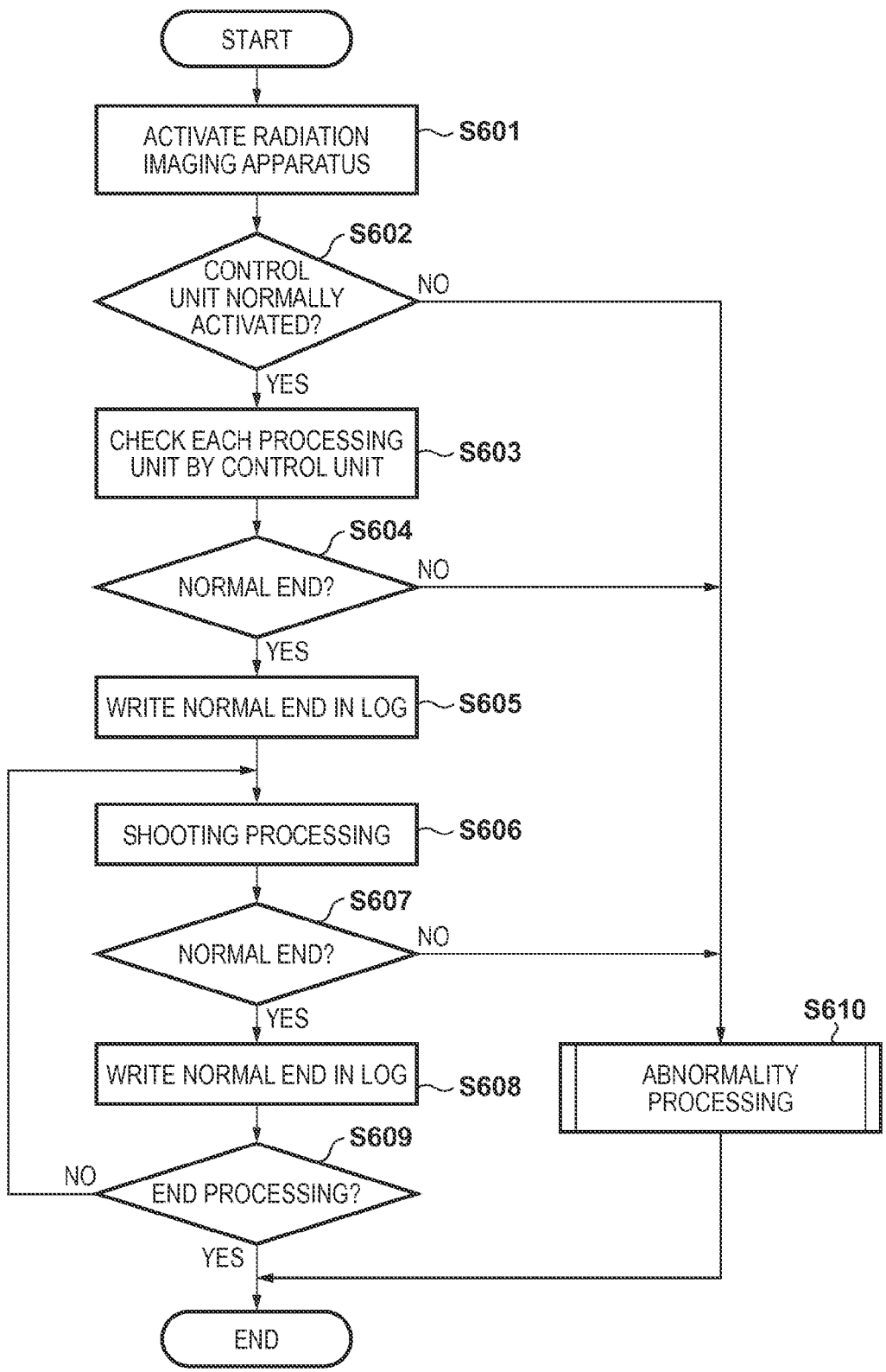
FIG. 6 is a flowchart showing the procedure of processing executed by the radiation imaging apparatus according to the first embodiment in a normal state.

FIG. 6 is a flowchart showing the procedure of processing executed by the radiation imaging apparatus according to the first embodiment in a normal state.

In step S601, the power supply unit 101 activates the radiation imaging apparatus 100 by starting supplying power to the processing units of the radiation imaging apparatus 100 in accordance with a user operation input via the operation unit 110.

In step S602, the radiation imaging apparatus 100 determines whether the control unit 103 is normally activated. If the control unit 103 is normally activated, the process advances to step S603. If the control unit 103 is not normally activated, the process advances to step S610. In step S603, the control unit 103 performs confirmation of the operation of each processing unit as part of the activation sequence. More specifically, the control unit 103 confirms output of each processing unit in response to input from the control unit 103 to the processing unit. The range of operation confirmation performed here is not particularly limited.

In step S604, the control unit 103 determines whether the operation confirmation of each processing unit has normally ended. If the operation confirmation has normally ended, the process advances to step S605. If the operation confirmation has not normally ended, the process advances to step S610. In step S605, the control unit 103 writes the normal end of operation confirmation in the log. In step S606, the control unit 103 performs shooting processing using the radiation imaging apparatus 100 based on a user operation or the like. In step S607, the control unit 103 determines whether the shooting processing has normally ended. If the shooting processing has normally ended, the process advances to step S608. If the shooting processing has not normally ended, the process advances to step S610.

In step S608, the control unit 103 writes the normal end of shooting processing in the log. In step S609, the control unit 103 determines whether to end the processing. For example, if user input to end shooting is done via the operation unit 110 after the normal end of shooting processing in step S606, the operation of the radiation imaging apparatus 100 is stopped to end the processing. If the user input is absent, the process returns to step S606.

In step S610, the radiation imaging apparatus 100 executes processing in an abnormal state. Details of the process of step S610 will be described later with reference to the flowchart of FIG. 7. The processing of the flowchart of FIG. 6 thus ends.

Figure 7:
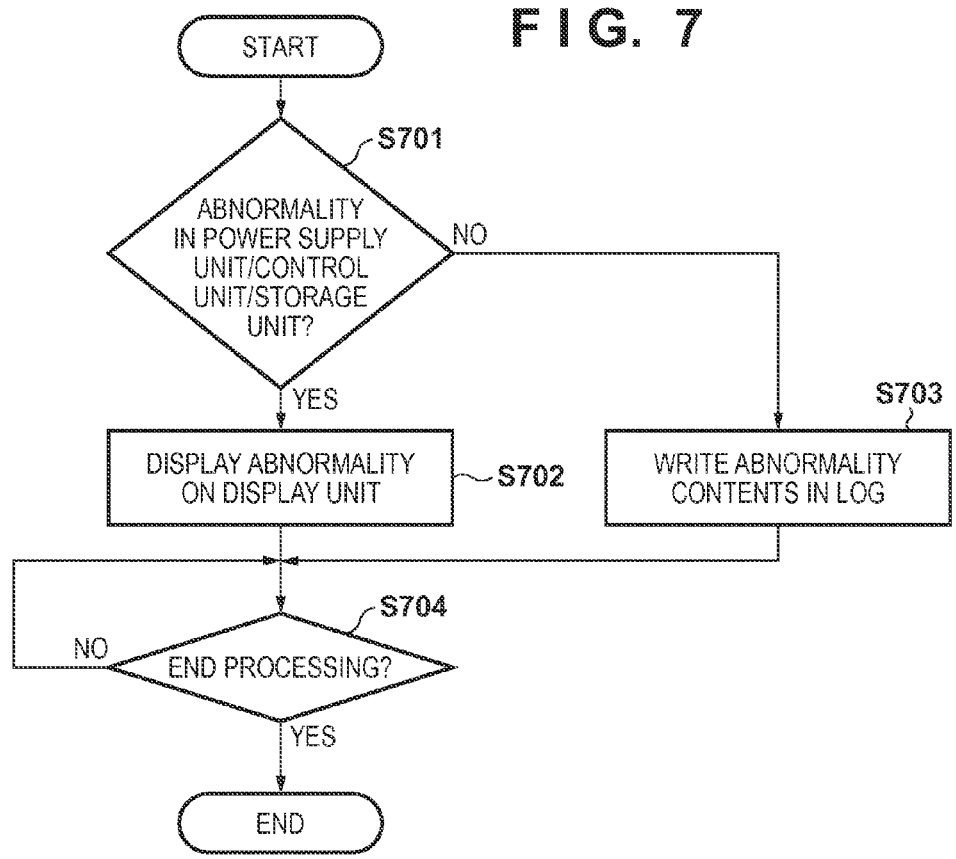
FIG. 7 is a flowchart showing the procedure of processing executed by the radiation imaging apparatus according to the first embodiment at the time of failure occurrence.

FIG. 7 is a flowchart showing the procedure of processing executed by the radiation imaging apparatus according to the first embodiment at the time of failure occurrence. The flowchart of FIG. 7 illustrates details of the process of step S610 shown in FIG. 6.

In step S701, the radiation imaging apparatus 100 determines whether the abnormality has occurred in one of the power supply unit 101, the control unit 103, and the storage unit 105. If the abnormality has occurred in one of the processing units, the process advances to step S702. If the abnormality has not occurred in the processing units, the process advances to step S703.

Figure 8:
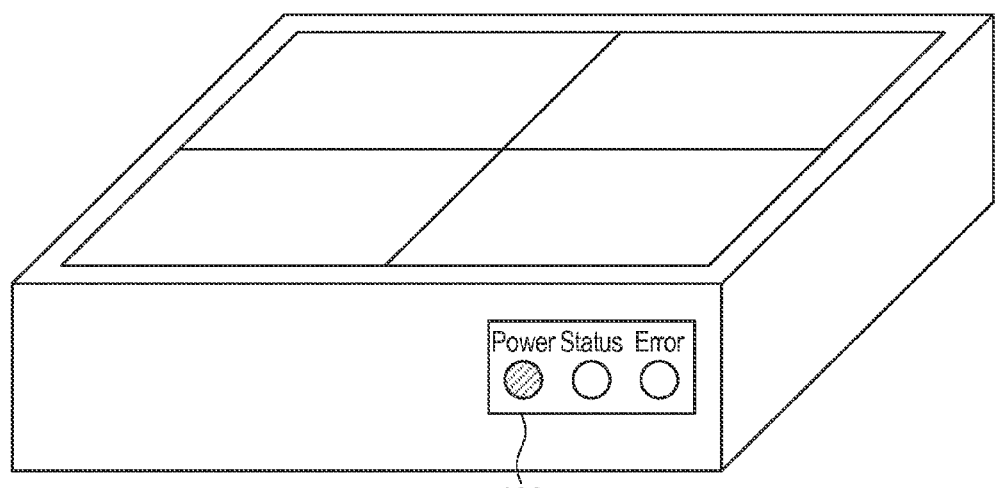
FIG. 8 is a perspective view showing an example of the arrangement of a display unit according to the first embodiment.

In step S702, the display unit 109 displays the state of the abnormality. Abnormality state display is done using, for example, the display unit 109 (three LEDs) provided on a side surface of the radiation imaging apparatus 100, as shown in FIG. 8. A Power LED lights up when a predetermined power is normally supplied, and goes off when the power is not normally supplied. A Status LED and an Error LED are controlled by the control unit 103 so as to light up, blink, go off, and the like. The Status LED lights up when the control unit 103 is normally activated, and the radiation imaging apparatus 100 is set in a shooting enable state. The Error LED lights up when an abnormality is detected as a result of operation confirmation of each processing unit by the control unit 103. If an abnormality exists in a processing unit, the user can confirm it in the following way. If the power supply unit 101 has an abnormality, this can be confirmed by the OFF state of the Power LED. If the control unit 103 has an abnormality, this can be confirmed as the Power LED lights up after power-on, but the remaining two LEDs do not light up even after waiting for a predetermined time. If any other processing unit has an abnormality, this can be confirmed as the Error LED lights up.

In step S703, if no abnormality exists in the power supply unit 101, the control unit 103, and the storage unit 105, the control unit 103 writes abnormality contents in the log based on the result of operation confirmation performed for each processing unit, and saves the information in the storage unit 105. If user input to end shooting is done via the operation unit 110 in step S704, the operation of the radiation imaging apparatus 100 is stopped to end the processing.

<6. Processing of Maintenance Apparatus>

Figure 9:
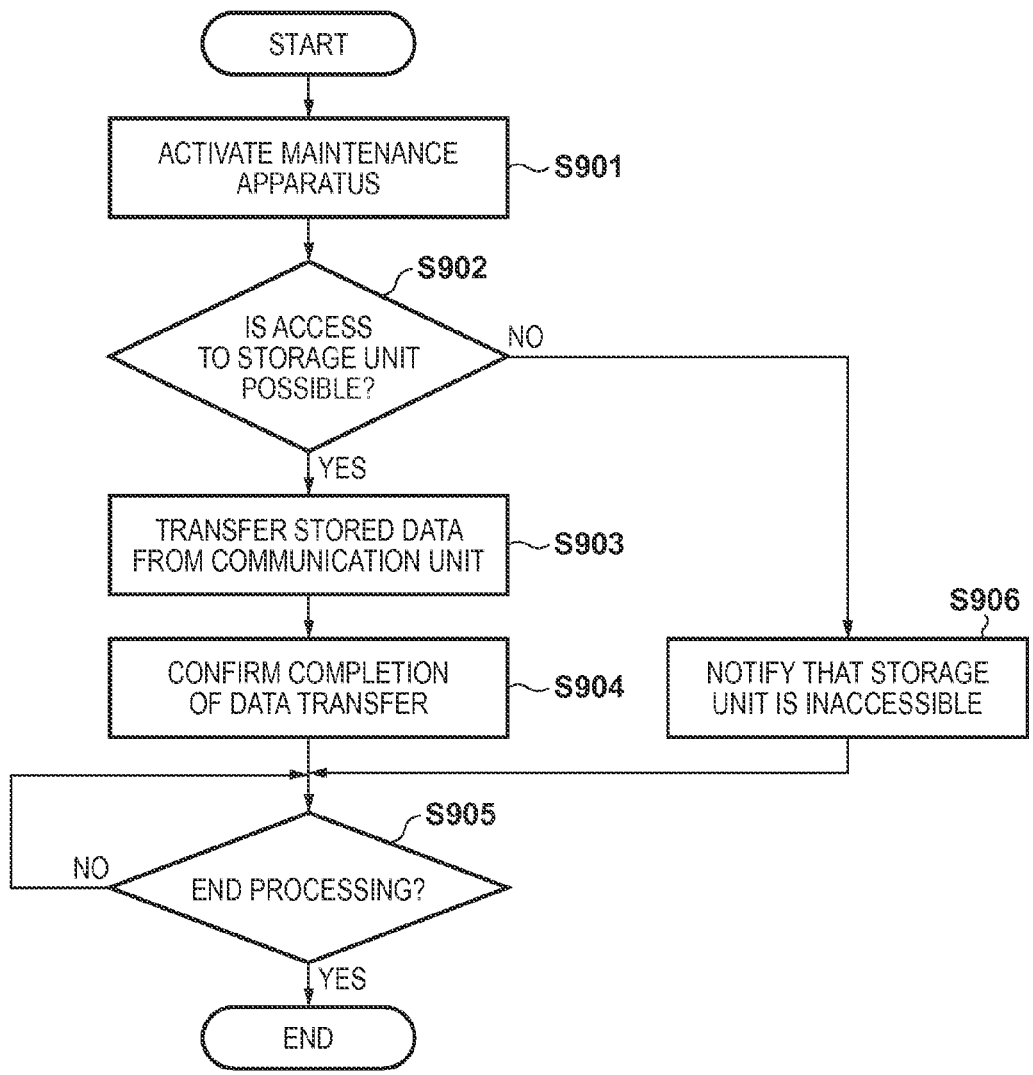
FIG. 9 is a flowchart showing the procedure of processing executed by the maintenance apparatus according to the first embodiment.

The procedure of processing executed by the maintenance apparatus 200 according to the first embodiment will be described next with reference to the flowchart of FIG. 9. Processing shown in FIG. 9 is processing of extracting log information using the maintenance apparatus 200 that is performed after the user has confirmed an abnormality in the control unit 103 via the display unit 109 during the normal operation of the radiation imaging apparatus 100. When some failure has occurred during the normal operation of the radiation imaging apparatus 100, the user can confirm the failure by LED display of the display unit 109 as shown in FIG. 8. After confirming the failure in the control unit 103 based on the displayed contents, the user connects the maintenance apparatus 200 to the radiation imaging apparatus 100 via the external connection units 203 and 107.

When the radiation imaging apparatus 100 and the maintenance apparatus 200 are connected, the bus switching unit 108 of the radiation imaging apparatus 100 switches the supply source of the power to be supplied to the storage unit 105 from the power supply unit 101 of the radiation imaging apparatus 100 to the power supply unit 201 of the maintenance apparatus 200. The transmission/reception path of data and control signals is thus switched from the bus 111 of the radiation imaging apparatus 100 to the bus 205 of the maintenance apparatus 200. When the bus is switched, the control unit 202 can access the storage unit 105. The operation of the control unit 202 of the maintenance apparatus 200 at this time will be described below in detail.

In step S901, the control unit 202 activates the maintenance apparatus 200. In step S902, the control unit 202 confirms whether access to the storage unit 105 is possible. If access to the storage unit 105 is possible, the process advances to step S903. If access to the storage unit 105 is not possible, the process advances to step S906.

In step S903, the control unit 202 obtains data stored in the storage unit 105 and transfers it to the outside of the maintenance apparatus 200 via the communication unit 204. The range of data to be transferred can comply with a preset range and is not particularly limited. For example, all data stored in the storage unit 105 may be transferred, or only stored log information may be transferred. Alternatively, only log information newly added after the last log information transfer may be extracted and transferred. In this case, it is necessary to internally hold information used to determine whether log information has already been transferred or make the transfer destination to notify the contents of finally received log information or the time of last reception. If untransferred image data remains in the storage unit 105, the image data may be transferred preferentially.

In step S904, the control unit 202 confirms completion of predetermined transfer by a reception completion signal from the external transfer destination or the like. In step S905, the control unit 202 determines whether to end the processing. The determination is done based on, for example, the presence/absence of a power-off operation of the user. If a power-off operation of the user exists, the processing ends.

Note that if access to the storage unit 105 is not possible in step S902, it can be assumed that a failure has occurred in the storage unit 105, power is not correctly supplied from the power supply unit 201 to the storage unit 105, or a failure has occurred in the bus switching unit 108. In any case, data readout from the storage unit 105 is impossible.

In step S906, the control unit 202 transfers information representing that data in the storage unit 105 cannot be read out from the communication unit 204 to the outside of the maintenance apparatus 200, and the information is notified to the user via the PC of the transfer destination or the like.

An example in which a failure occurs in the control unit 103 has been described above. Even if a failure occurs in the power supply unit 101, the storage unit 105, the communication unit 106, or the like, log information can be read out, and the data can be transferred to the outside of the radiation imaging apparatus 100 using the same arrangement and procedure as described above.

According to this embodiment, even in a case where some functions such as a control unit of the radiation imaging apparatus have failed, it is possible to extract, using an external apparatus, desired data from the radiation imaging apparatus in which the failure has occurred.

Second Embodiment

In the first embodiment, an example has been described in which the maintenance apparatus 200 supplies the power supply voltage and control signals needed by the storage unit 105 in the radiation imaging apparatus 100.

In the second embodiment, a radiation imaging apparatus 100 capable of extracting log information in case of failure occurrence even if a power supply voltage or control signal supplied from a maintenance apparatus 200 is not a predetermined voltage or signal will be described.

Figure 10:
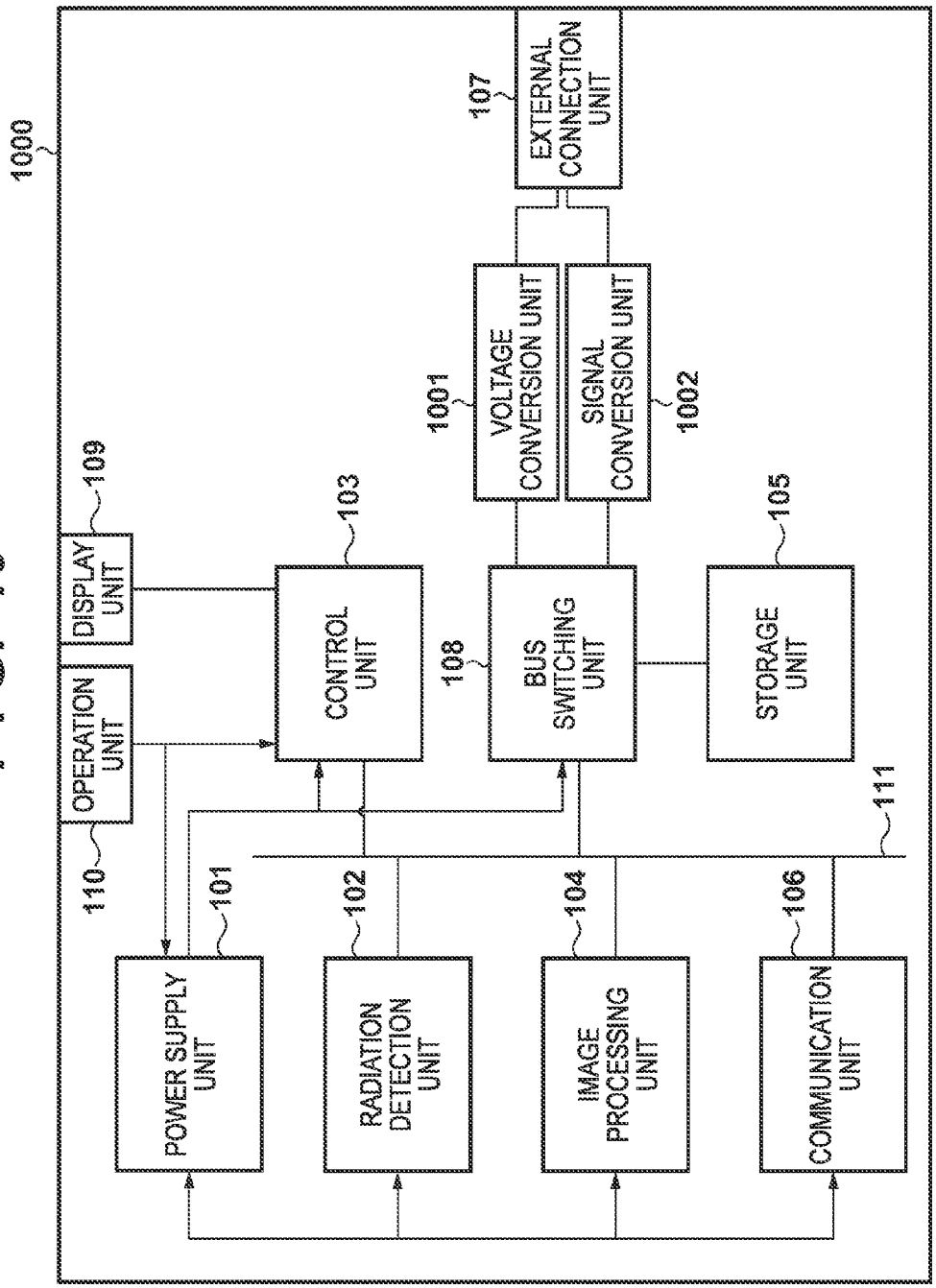
FIG. 10 is a block diagram showing an example of the arrangement of a radiation imaging apparatus according to the second embodiment.

FIG. 10 is a block diagram showing an example of the arrangement of a radiation imaging apparatus 1000 according to the second embodiment. The same reference numerals as in FIG. 1 described in the first embodiment denote the same components in FIG. 10. The radiation imaging apparatus 1000 includes a voltage conversion unit 1001 and a signal conversion unit 1002 in addition to the components shown in FIG. 1.

The voltage conversion unit 1001 compares a power supply voltage input via an external connection unit 107 with a predetermined power supply voltage needed by a storage unit 105, and if the input power supply voltage is different from the predetermined voltage, converts the control unit into the predetermined voltage by a voltage level conversion circuit (not shown) and then outputs the voltage to the storage unit 105. On the other hand, if the power supply voltage input via the external connection unit 107 equals the predetermined voltage, the voltage conversion unit 1001 directly outputs the power supply voltage to the storage unit 105. The voltage level conversion circuit can include one boost/step-down circuit or a plurality of boost circuits, step-down circuits, and boost/step-down circuits.

The signal conversion unit 1002 interprets a signal input via the external connection unit 107 if the input signal is of a type different from that of a signal on the bus 111 connected to the storage unit 105, and converts the input signal into a predetermined signal for the storage unit 105. Signal conversion is not particularly limited, and polarity conversion, serial/parallel conversion, or protocol conversion by a general-purpose interface such as USB or PClexpress is performed.

The normal operation of the radiation imaging apparatus 1000 is the same as in the first embodiment, and a description thereof will be omitted. An operation of extracting log information using then maintenance apparatus 200 in a case where a failure has occurred in a control unit 103 of the radiation imaging apparatus 1000 is also the same as in the first embodiment, and a description thereof will be omitted.

In this embodiment, an example in which the voltage conversion unit 1001 and the signal conversion unit 1002 are provided in the radiation imaging apparatus 1000 to convert the power supply voltage or signal has been described. The voltage conversion unit 1001 or the signal conversion unit 1002 may be provided separately as a conversion cable to convert the power supply voltage or signal.

As described above, according to this embodiment, the arrangement is applied not only to the maintenance apparatus dedicated to the radiation imaging apparatus but also to an apparatus that uses a different internal memory and cannot output a predetermined voltage, for example, a maintenance apparatus for another product. Hence, even such an apparatus can read out log information and transfer it to the outside of the radiation imaging apparatus in case of a failure.

In addition, in a manner an electric device having a communication function, for example, a smartphone accesses an external storage device such as a USB memory, log information can be read out and transferred to the outside of the radiation imaging apparatus in case of a failure in the radiation imaging apparatus.

Third Embodiment

In the first and second embodiments, an example in which the maintenance apparatus is provided as a separate body outside the radiation imaging apparatus has been described. In the third embodiment, however, an example in which a radiation imaging apparatus includes a maintenance unit (corresponding to the maintenance apparatus in the first and second embodiments) will be described.

<1. Arrangement of Radiation Imaging Apparatus>

Figure 11:
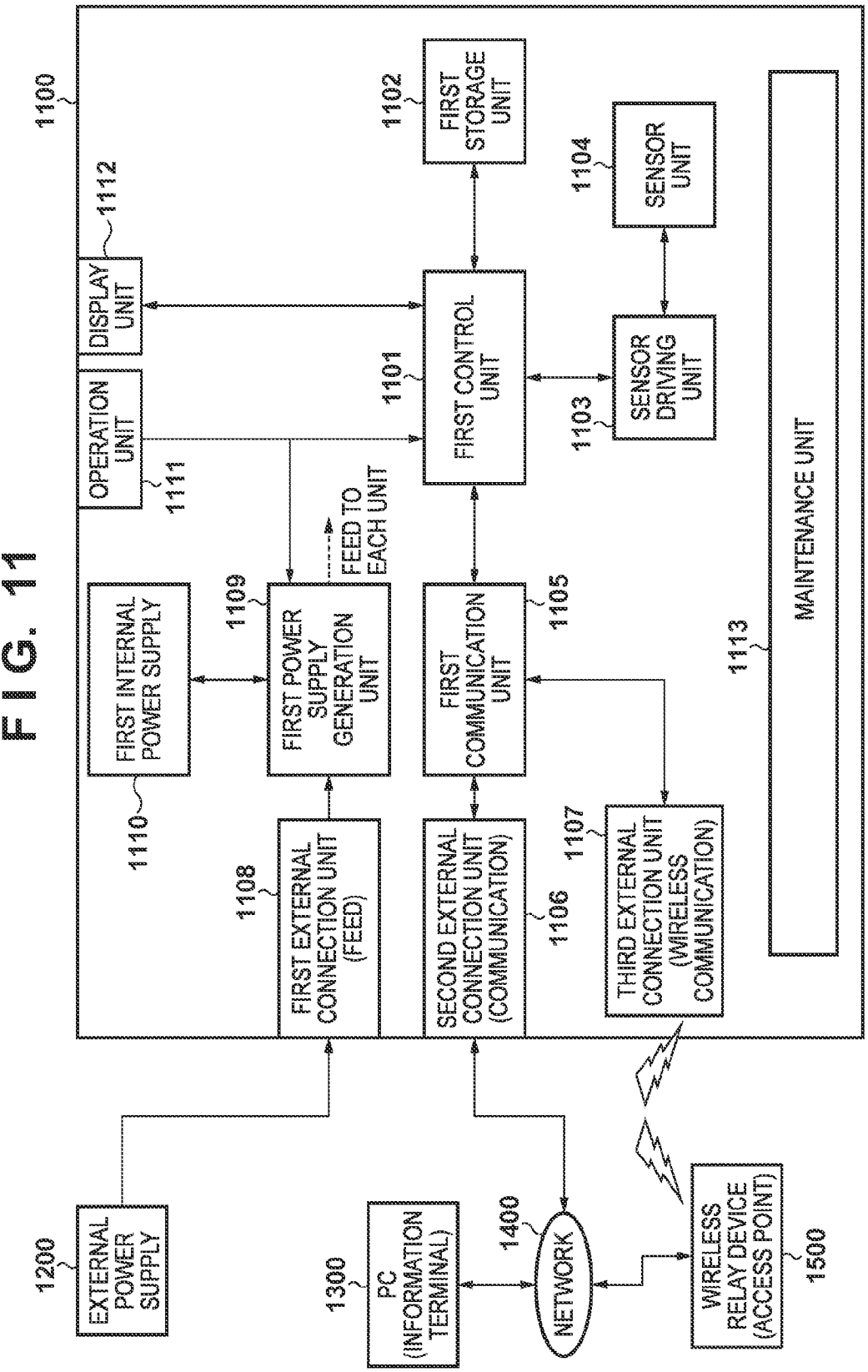
FIG. 11 is a block diagram showing an example of the arrangement and peripheral devices of a radiation imaging apparatus according to the third embodiment.

FIG. 11 is a block diagram showing an example of the arrangement of a radiation imaging apparatus according to the third embodiment and an example of the arrangement of a radiation imaging system that exchanges information and power with the radiation imaging apparatus. Reference numeral 1100 denotes a radiation imaging apparatus; 1200, an external power supply; 1300, a PC; 1400, a network; and 1500, a wireless relay device.

The radiation imaging apparatus 1100 includes a first control unit 1101, a first storage unit 1102, a sensor driving unit 1103, a sensor unit 1104, a first communication unit 1105, a first external connection unit 1108, a second external connection unit 1106, a third external connection unit 1107, a first power supply generation unit 1109, a first internal power supply 1110, an operation unit 1111, a display unit 1112, and a maintenance unit 1113. Note that the sensor driving unit 1103 and the sensor unit 1104 correspond to the radiation detection unit 102 described in the first and second embodiments.

The first control unit 1101 performs processing concerning control of each unit of the radiation imaging apparatus 1100. For example, the first control unit 1101 outputs, to the sensor driving unit 1103, an instruction to drive the sensor unit 1104 for shooting, saves obtained image data in the first storage unit 1102, or extracts image data from the first storage unit 1102. The first control unit 1101 also transmits image data to another device via the first communication unit 1105, receives an instruction from another device, or executes, for example, switching of activation/stop of the radiation imaging apparatus 1100 based on an operation from the operation unit 1111. The first control unit 1101 further notifies the user of an operation state or error state via the display unit 1112. Note that in this embodiment, the first control unit 1101 performs the processing. However, the processing may be distributively performed by a plurality of, that is, two or more control units.

The first storage unit 1102 is used to save image data obtained by the radiation imaging apparatus 1100 or log information representing the result of internal processing or the like. If the first control unit 1101 is a CPU or the like using software, the first storage unit 1102 can store a program for that. Detailed implementation is not limited, and the first storage unit 1102 can be implemented by various combinations of memories, HDDs, and volatile memories/nonvolatile memories. In this embodiment, only one storage unit is illustrated. However, a plurality of storage units may be provided. In this embodiment, the first storage unit 1102 stores log information or the like. A storage unit that stores software and the like necessary for the operation of the first control unit 1101 is included in the first control unit 1101.

The sensor driving unit 1103 drives the sensor unit 1104. The sensor driving unit 1103 selects, out of the photodetector array included in the sensor unit 1104 (to be described later), a row or column to extract an electrical signal, and amplifies the extracted electrical signal or performs feed to the photodetector array. The extracted electrical signal is sent to the first control unit 1101 and further sent to the first storage unit 1102 via the first control unit 1101.

The sensor unit 1104 includes a scintillator and a photodetector array (neither are shown), and converts emitted radiation into an electrical signal. The scintillator and the photodetector array have a two-dimensional planar shape and are adjacent with their surfaces facing each other. The scintillator is excited by radiation and emits visible light. The photodetector array converts the visible light into an electrical signal. Note that the type of the scintillator and the type of the photodetector array are not particularly limited, and various types are applicable.

The first communication unit 1105 performs processing for implementing communication between the radiation imaging apparatus 1100 and another device. The first communication unit 1105 according to this embodiment is connected to the second external connection unit 1106 serving as a wired communication path and the third external connection unit 1107 serving as a wireless communication path, and can select one of the paths to be used to connect another device. For example, the second external connection unit 1106 is a connector capable of connecting an external device, and the third external connection unit 1107 is an antenna. Note that as for the communication, only wired communication or only wireless communication may be provided. The communication method is not particularly limited.

The first external connection unit 1108 is provided for feed and connected to the external power supply 1200. Power from the external power supply 1200 is supplied to the first power supply generation unit 1109 of the radiation imaging apparatus 1100 via the first external connection unit 1108. As a detailed implementation example, a general connector that implements electrical connection by bringing metal terminals into contact with each other or a connector that implements noncontact feed by assigning roles of transmission and reception to coil-shaped conductive members facing each other and causing electromagnetic induction is usable.

The first power supply generation unit 1109 generates a voltage/current needed by the units of the radiation imaging apparatus 1100 from power supplied from the first internal power supply 1110 or power supplied from outside via the first external connection unit 1108, and distributively supplies it. Note that if feed from outside exists, the first power supply generation unit 1109 can charge the first internal power supply 1110 as needed.

The first internal power supply 1110 is, for example, a rechargeable battery and has a detachable form. Note that the first internal power supply 1110 is not limited to the example of this embodiment, and chargeable/unchargeable state, the detachable/undetachable state, and the power generation method can variously be combined.

The operation unit 1111 accepts a user operation. The implementation method is not particularly limited, accepting an input from the user suffices. More specifically, the operation unit 1111 can be implemented by various kinds of switches and a touch panel manually operated by the user. A reception unit that receives an input from a remote controller dedicated to operations may additionally be provided. In this embodiment, two push switches are provided. The user can input various kinds of information to the radiation imaging apparatus 1100 by combining the input states and pressing times of the push switches.

The display unit 1112 notifies the user of the state of the radiation imaging apparatus 1100 and the like. The implementation method is not particularly limited, and the display unit 1112 can be implemented by an LED, LCD, monitor, or the like. As a method of notification to the user, a speaker may be provided. In this embodiment, two LEDs are provided, and the user is notified of the state of the radiation imaging apparatus 1100 or the like by combining the ON/OFF of the LEDs or lighting methods (blink/blink interval).

The external power supply 1200 supplies power to the first power supply generation unit 1109 via the first external connection unit 1108. An implementation example is not limited, and power may be extracted from a wall socket (not shown) in a hospital or home and supplied to the first power supply generation unit 1109. The external power supply 1200 can be implemented as a dedicated unit configured to perform A/D conversion or voltage conversion. It may take a form like an AC adapter. The external power supply 1200 may be provided with a switch that sets a feed enable/disable state, or a control function of determining whether feed is possible may be incorporated.

The PC 1300 is a console for the radiation imaging system or a maintenance PC configured to confirm the state of the radiation imaging apparatus 1100. Note that in this embodiment, reference numeral 1300 denotes a PC. However, the implementation method is not limited to the PC, and any information terminal is usable. For example, a portable information device terminal such as a notebook PC or a tablet PC may be used.

If the PC 1300 functions as the console of the radiation imaging system, software that controls the radiation imaging system is installed in the PC 1300. If the software executes processing of starting imaging, the information is sent to the radiation imaging apparatus 1100 via the network 1400. At this time, the network 1400 is a local area network (to be referred to as a LAN hereinafter). As a method of finally transmitting information to the radiation imaging apparatus 1100, wired/wireless communication is set in consideration of a preset connection priority or usability condition. Via wireless communication, information is exchanged between the wireless relay device 1500 installed in the LAN and the third external connection unit 1107 of the radiation imaging apparatus 1100. When imaging ends, and the radiation imaging apparatus 1100 obtains image data, the radiation imaging apparatus 1100 transmits the image data to the PC 1300 via the network 1400 again, and the PC 1300 displays the image on the screen. The radiation imaging apparatus 1100 also steadily saves an internal operation state and the like as log information, and transmits the log information to the PC 1300 at a timing preset in the radiation imaging apparatus 1100 or a timing requested by the PC 1300.

On the other hand, if the PC 1300 functions as a maintenance PC, the network 1400 need not always be a LAN and may be a wide area network (to be referred to as a WAN hereinafter) that connects facilities. A maintenance PC that exists in a remote site may be configured to collect log information at an arbitrary timing.

The arrangement of the radiation imaging apparatus 1100 has been described above. If a failure occurs in a processing unit of which there is only one in the radiation imaging apparatus 1100, for example, the first control unit 1101, the first communication unit 1105, or first power supply generation unit 1109, data output is impossible.

As for the remaining processing units, even in case of a failure, data output can be performed in some way, or output itself may be meaningless. For example, if a failure has occurred in the first internal power supply 1110, the first internal power supply 1110 is replaced, or power supply is switched to feed from the external power supply 1200. If an unrecoverable failure has occurred in the first storage unit 1102, data to be output itself is lost, and therefore, outputting data is meaningless.

Details of the maintenance unit 1113 that enables data output in case of a failure that cannot be dealt with in a normal state will be described below.

<2. Arrangement of Maintenance Unit>

Figure 12:
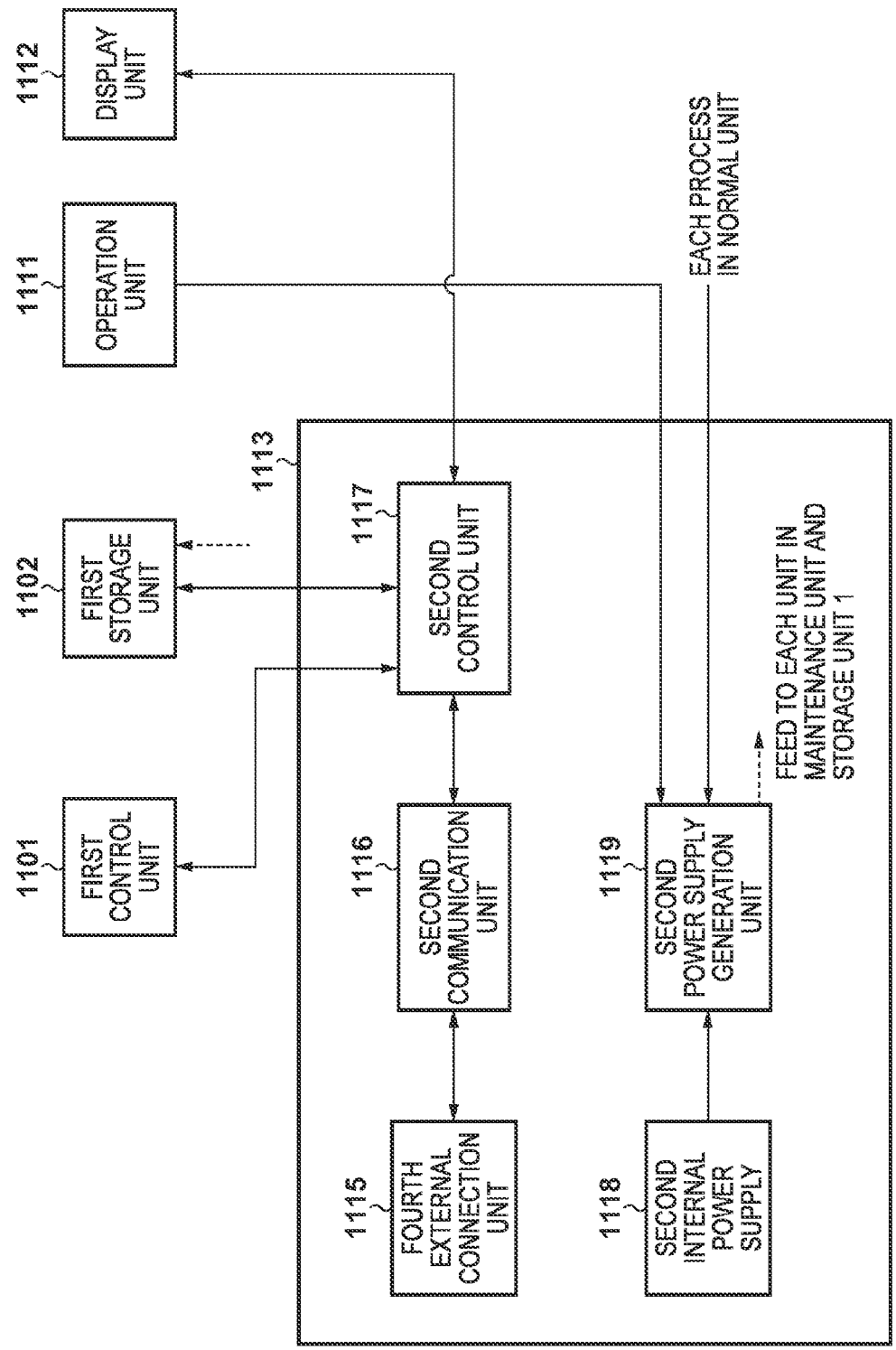
FIG. 12 is a block diagram showing an example of the arrangement of a maintenance unit according to the third embodiment and an example in which power and information are exchanged with the radiation imaging apparatus.

FIG. 12 is a block diagram showing an example of the arrangement of the maintenance unit according to the third embodiment and an example in which power and information are exchanged with the radiation imaging apparatus.

The maintenance unit 1113 includes a fourth external connection unit 1115, a second communication unit 1116, a second control unit 1117, a second internal power supply 1118, and a second power supply generation unit 1119. The processing unit in the maintenance unit 1113 has a function corresponding to a processing unit, such as the first control unit 1101, the first communication unit 1105, or the first power supply generation unit 1109 in the radiation imaging apparatus 1100, of which there is only one, and whose failure results in output of data becoming impossible.

The processing units of the maintenance unit 1113 are activated basically when a failure occurs in a processing unit of the radiation imaging apparatus 1100 other than the maintenance unit 1113, and data output from the radiation imaging apparatus 1100 to the outside is impossible. Log information or image data that has not been output and remains in the first storage unit 1102 is then output to the outside.

The second control unit 1117 can not only exchange data with other processing units in the maintenance unit 1113 but also access the first storage unit 1102 outside the maintenance unit 1113. The second power supply generation unit 1119 can also charge the first storage unit 1102. Hence, even if an unrecoverable failure occurs in the first control unit 1101 or the first power supply generation unit 1109 that exists outside the maintenance unit 1113, it is possible to drive the first storage unit 1102 and extract data from the first storage unit 1102.

The second internal power supply 1118 and the second power supply generation unit 1119 can share power to operate the maintenance unit 1113 and the first storage unit 1102. The second internal power supply 1118 is not particularly limited, like the first internal power supply 1110, and the chargeable/unchargeable state, the detachable/undetachable state, and the power generation method can variously be combined.

The second communication unit 1116 and the fourth external connection unit 1115 are used by the second control unit 1117 to output data obtained from the first storage unit 1102 to the outside. The fourth external connection unit 1115 can use either of wireless and wired communication.

<3. Outer Appearance and Structure of Radiation Imaging Apparatus>

Figure 13A:
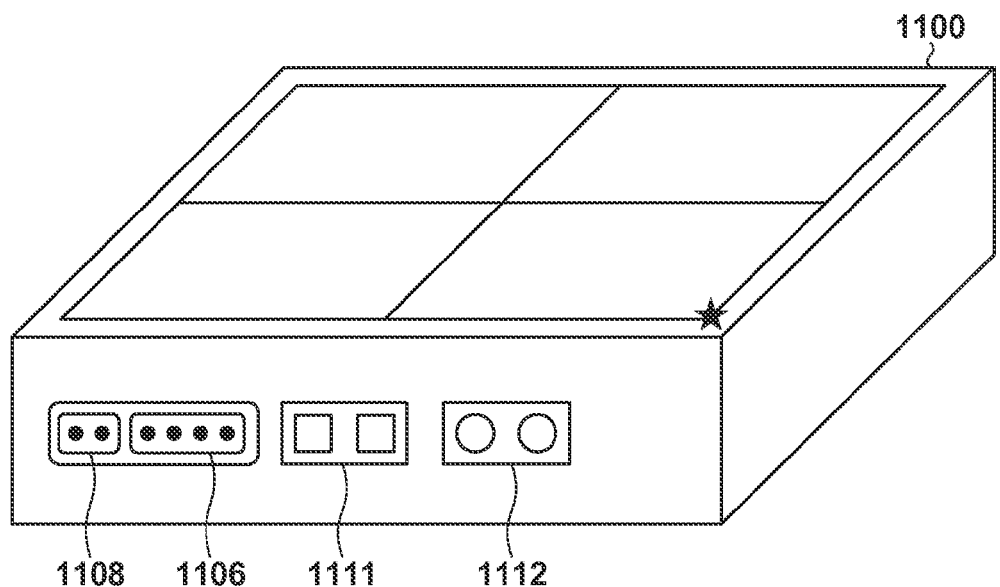
FIGS. 13A and 13B are perspective views showing an example of the outer appearance and structure of the radiation imaging apparatus according to the third embodiment.
Figure 13B:
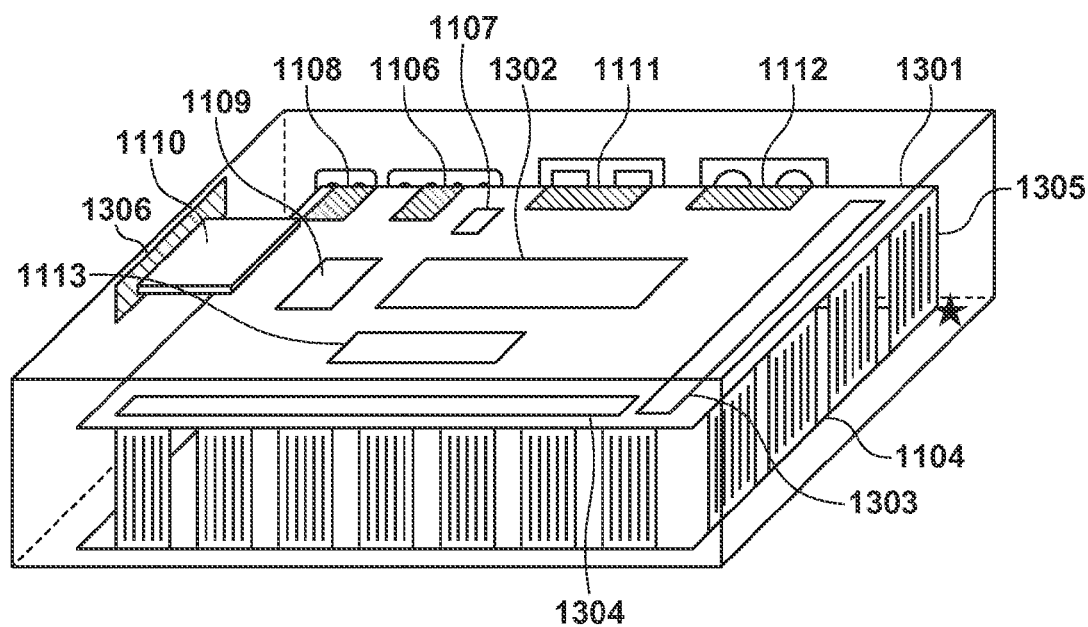

FIGS. 13A and 13B are perspective views showing an example of the outer appearance and structure of the radiation imaging apparatus 1100. FIG. 13A is a perspective view showing the outer appearance of the radiation imaging apparatus 1100, and FIG. 13B is a perspective view of the radiation imaging apparatus 1100 turned so as to move the far side in FIG. 13A to the near side. As is apparent from the positional relationship between a star symbol and the reference numerals of components in FIG. 13A and a star symbol and reference numerals in FIG. 13B, FIGS. 13A and 13B illustrate the radiation imaging apparatus 1100 observed from different angles. Note that the same reference numerals as those of the components described with reference to FIGS. 11 and 12 denote the same components in FIGS. 13A and 13B.

As shown in FIG. 13A, the operation unit 1111, the display unit 1112, and various kinds of external connection units (the first external connection unit 1108 and the second external connection unit 1106) are provided on a case. The shape, size, and material of the case are not particularly limited as long as it can store the processing units. The first external connection unit 1108 is a connector for power supply, and the second external connection unit 1106 is a connector for communication. The operation unit 1111 includes two switches operable by the user. The display unit 1112 includes two LEDs that notify the user of a state. Note that in this embodiment, the first external connection unit 1108 and the second external connection unit 1106 are implemented as separate connectors. However, they may be integrated into one connector.

As shown in FIG. 13B, the planar sensor unit 1104 is arranged in the case. A fixing panel 1301 is arranged to face the sensor unit 1104. The sensor unit 1104 is arranged such that the scintillator and the photodetector array each having a planar shape face each other, as described above. The fixing panel 1301 fixes the position of each unit in the radiation imaging apparatus 1100.

A control board 1302 is arranged as one electric circuit board, and incorporates the first control unit 1101 (for example, CPU), the first communication unit 1105 (for example, communication IC), and the first storage unit 1102 (for example, memory IC). The third external connection unit 1107 is an antenna module for wireless communication and is used by the first communication unit 1105 (for example, communication IC) in the control board 1302.

An amplification unit 1303 and a drive unit 1304 are components described as the sensor driving unit 1103. The amplification unit 1303 has a function of amplifying a signal output from the sensor unit 1104. The drive unit 1304 drives the photodetector array in the sensor unit 1104.

The amplification unit 1303 and the drive unit 1304 are arranged as one electric circuit board. The amplification unit 1303 and the drive unit 1304 are driven by the CPU or the like on the control board 1302. Data output from the amplification unit 1303 is returned to the CPU or the like on the control board 1302.

An opening portion 1306 is used to insert a battery that is the first internal power supply 1110 detachable from the radiation imaging apparatus 1100 into the radiation imaging apparatus 1100 or extract the battery from the radiation imaging apparatus 1100. In this embodiment, the opening portion 1306 is formed in a side surface of the case. However, the position of the opening is not limited, and the opening portion may be provided in a surface opposing the surface where the sensor unit 1104 is arranged. The opening portion 1306 can be arranged at any position where power can be supplied from the first internal power supply 1110 to the first power supply generation unit 1109. In FIG. 13B, the first power supply generation unit 1109 is arranged as one electric circuit board.

A flexible board 1305 has a function of mediating signal exchange, and transmits a signal from the sensor unit 1104 to the amplification unit 1303 or transmits a driving signal from the drive unit 1304 to the sensor unit 1104. In the maintenance unit 1113 as well, the second control unit 1117 and the second communication unit 1116 included in it are formed from a CPU, a communication IC, or the like, as in the control board 1302.

An example in which a plurality of electric circuit boards are provided has been described above. However, they may be integrated or separated as needed.

<4. Processing of Radiation Imaging Apparatus>
Each process executed by the radiation imaging apparatus 1100 according to the third embodiment will be described next.

Figure 14:
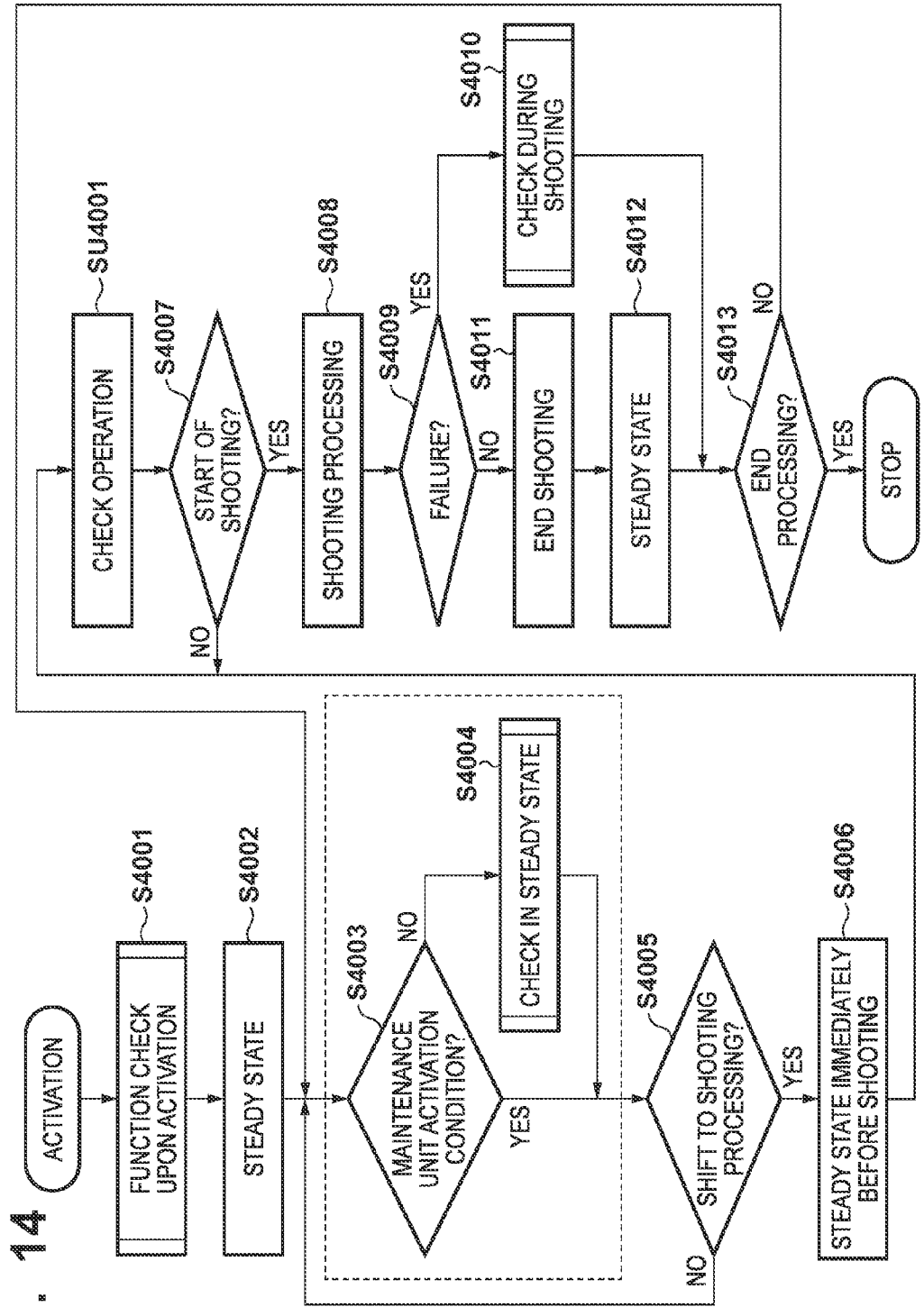
FIG. 14 is a flowchart showing the procedure of a series of processes from the activation to end of the radiation imaging apparatus according to the third embodiment.

[Series of Processes]
The procedure of a series of processes from the activation to end of the radiation imaging apparatus 1100 will be described first with reference to the flowchart of FIG. 14.

In step S4001, the radiation imaging apparatus 1100 executes function check processing upon activation. Details of the process of step S4001 will be described later with reference to FIGS. 15A and 15B. The operation of each unit of the radiation imaging apparatus 1100 is checked, and if no failure exists, the process advances to step S4002. If a failure exists, the process advances to step S4011.

In step S4002, the radiation imaging apparatus 1100 shifts to a steady state. In step S4003, the radiation imaging apparatus 1100 determines whether a situation matching the activation condition of the maintenance unit 1113 has occurred. If the situation has occurred, the process advances to step S4004. If the situation has not occurred, the process advances to step S4005. In step S4004, the maintenance unit 1113 executes check of the first storage unit 1102 and data extraction. Details of the process of step S4004 will be described later with reference to FIG. 16.

In step S4005, the radiation imaging apparatus 1100 determines whether to shift to shooting processing. As an actual operation example, when the screen shifts to an operation window to make the user input object information on the software screen on the PC 1300, the radiation imaging apparatus 1100 determines that shooting starts after the object information is input, When notified of the start of shooting, the radiation imaging apparatus 1100 shifts to shooting processing. To shift to shooting processing, the process advances to step S4006. If the radiation imaging apparatus does not shift to shooting processing, the process returns to step S4003.

In step S4006, the radiation imaging apparatus 1100 transits to the steady state immediately before shooting. In this state, shooting processing is not executed, but power supply to the sensor unit 1104 is started to prepare for shooting, thereby executing shooting preparation. In this state as well, the check operations of steps S4003 and S4004 are possible. FIG. 14 illustrates the check operations as step SU4001 between the process of step S4006 and the process of step S4007.

In step S4007, the radiation imaging apparatus 1100 determines whether to start shooting. To start shooting, the process advances to step S4008. If shooting is not to be started, the process returns to step SU4001. For example, when the user completes input of object information on the software screen of the PC 1300 to shift to a window for shooting, and a radiation irradiation start signal is notified from the PC 1300 or a radiation generator to the radiation imaging apparatus 1100, the radiation imaging apparatus 1100 determines to start shooting. Note that although not illustrated in FIG. 11, the radiation generator is a device connectable via the network 1400.

Alternatively, if the radiation imaging apparatus 1100 includes a mechanism capable of detecting radiation irradiation by itself, it may determine to start shooting when the user shifts to a state in which the window for shooting is opened.

In step S4008, the radiation imaging apparatus 1100 detects emitted radiation and obtains image data. In step S4009, the radiation imaging apparatus 1100 determines whether a failure has occurred in shooting processing. If a failure has occurred, the process advances to step S4010. If no failure has occurred, the process advances to step S4011. In step S4010, the radiation imaging apparatus 1100 executes check processing during shooting. Details of process of step S4010 will be described later with reference to FIG. 18.

In step S4011, the radiation imaging apparatus 1100 ends shooting. In step S4012, the radiation imaging apparatus 1100 transits to the steady state. In step S4013, the radiation imaging apparatus 1100 performs end determination to determine whether to stop the imaging unit. If the processing is not to be ended, the process returns to step S4003 to repeat the same processing.

An example of the series of processes from the activation to end of the radiation imaging apparatus 1100 has been described above. However, the overall procedure is not limited to this. For example, to urgently start shooting, the process may advance directly from step S4005 to S4012. The procedure of processing can freely be configured.

[Function Check Processing Upon Activation]

Figure 15B:
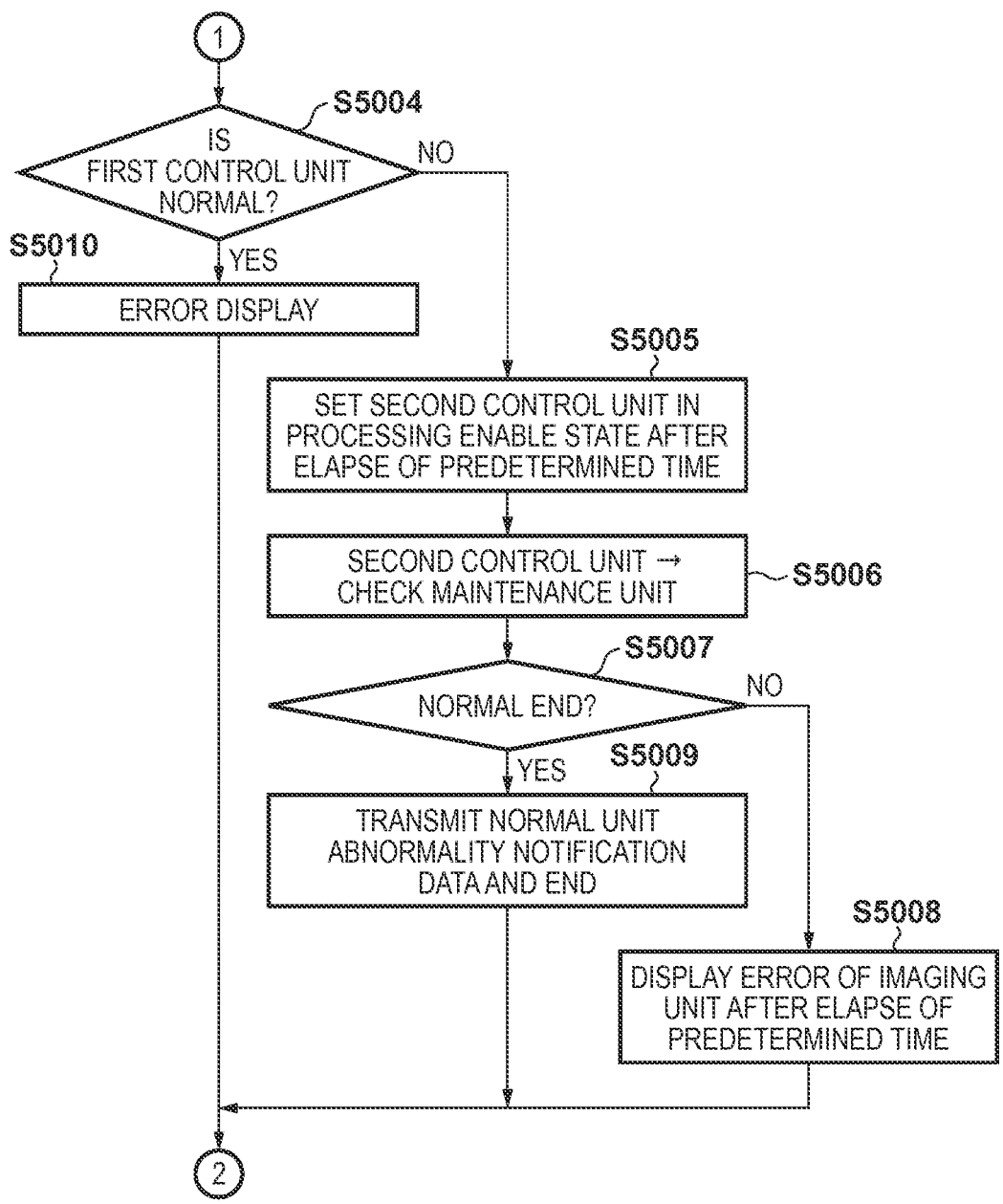

Details of function check processing upon activation in step S4001 will be described with reference to the flowchart of FIGS. 15A and 15B.

The radiation imaging apparatus 1100 starts an activation sequence based on an input from outside. The type of the input from outside is not particularly limited. The first power supply generation unit 1109 may start feed to each processing unit based on a user operation on the operation unit 1111. Alternatively, the first power supply generation unit 1109 may detect the start of feed from the external power supply 1200 and thus start feed to each processing unit. In this embodiment, activation is done based on an input by a user operation via the operation unit 1111. When an activation instruction from the user is input to the operation unit 1111, the activation signal is transmitted to the second power supply generation unit 1119 in the maintenance unit 1113 as well, and each processing unit of the maintenance unit 1113 is activated. In step S5001, feed to the maintenance unit 1113 and processing units (to be referred to as a normal unit for the descriptive convenience) other than the maintenance unit 1113, which perform a normal operation, starts.

In step S5002, the first control unit 1101 confirms the operation of the normal unit after the start of feed. More specifically, the first control unit 1101 observes each output, thereby checking whether each processing unit existing in the normal unit is normally operating. The first control unit 1101 and the second control unit 1117 can exchange signals. When operation confirmation is completed, the first control unit 1101 outputs a signal representing the information to the second control unit 1117. In this way, the first control unit 1101 can perform operation confirmation first, and the second control unit 1117 can wait for processing during that time. The range of operation confirmation performed here is not particularly limited.

In step S5003, the first control unit 1101 and the second control unit 1117 determine whether the check of the normal unit has normally ended. If the check has normally ended, the process advances to step S5011. If the check has not normally ended, the process advances to step S5004. If no failure exists in the first control unit 1101, the first control unit 1101 can determine the check result. Even if a failure exists in the first control unit 1101, the second control unit 1117 can determine that a failure exists in the normal unit based on a fact that a check completion signal to be output from the first control unit 1101 has not been received even after the elapse of a predetermined time. Note that the first control unit 1101 and the second control unit 1117 can notify the PC 1300 or the like outside the radiation imaging apparatus 1100 of the information of the check result via the first communication unit 1105 and the second communication unit 1116, respectively.

In step S5004, the radiation imaging apparatus 1100 determines whether the first control unit 1101 itself is normal. If the first control unit 1101 is normal, the process advances to step S5010. If the first control unit 1101 is not normal, the process advances to step S5005. In this determination, the first control unit 1101 itself can notify another processing unit that it is normal, or the determination can be done based on whether the second control unit 1117 has received a signal to be output from the first control unit 1101, as in the process of step S5003. Alternatively, each processing unit corresponding to the normal unit may output a signal to the second control unit 1117 to cause the second control unit 1117 to do the determination. By way of precaution against a determination disable state of the second control unit 1117, a setting may be done in advance to notify whether the processing has ended between the PC 1300 and the normal unit or the maintenance unit 1113 of the radiation imaging apparatus 1100. If neither has made a notification for a predetermined time or more, information representing that the radiation imaging apparatus 1100 cannot normally be activated may be notified to the user via the display unit 1112 attached to the PC 1300. In this case, the user needs to operate the operation unit 1111 of the radiation imaging apparatus 1100 to stop the radiation imaging apparatus 1100 and thus forcibly stop the processing.

In step S5005, the operation authority is switched to the second control unit 1117 after the elapse of a predetermined time, and the second control unit 1117 is set in a state capable of checking the function of the maintenance unit 1113.

In step S5006, the second control unit 1117 checks the function of the maintenance unit 1113. In this embodiment, the second control unit 1117 establishes communication with the outside via the second communication unit 1116 or the fourth external connection unit 1115, or confirms whether access to the first storage unit 1102 is possible. However, the procedure is not particularly limited to this example.

In step S5007, the second control unit 1117 determines whether the check of the maintenance unit 1113 has normally ended. If the check has normally ended, the process advances to step S5009. If the check has not normally ended, the process advances to step S5008. Note that if the second control unit 1117 is normally operating, it can notify each processing unit of the determination result. Even in a case where the second control unit 1117 is not normally operating, if a setting has been done in advance to notify the check determination to the PC 1300 outside the radiation imaging apparatus 1100, the determination can be done on the side of the PC 1300 based on the presence/absence of the notification.

In step S5008, the second control unit 1117 or the PC 1300 notifies the user, after the elapse of a predetermined time, that normal shooting is impossible, and the maintenance unit 1113 cannot perform the normal operation, either. As the notification method, the notification is executed using the display function of the display unit 1112 provided in the radiation imaging apparatus 1100 or a monitor provided in the PC 1300. In this case, neither the normal operation (shooting) nor data extraction is possible. Hence, the radiation imaging apparatus 1100 is powered off by the user and thus transits to a stop state. The radiation imaging apparatus 1100 may automatically transit to the stop state after displaying an error state for a predetermined time.

In step S5009, the second control unit 1117 or the PC 1300 notifies that the normal unit is in an abnormal state, as in the process of step S5008. In addition, the maintenance unit 1113 accesses the first storage unit 1102 and outputs log information or the like to the PC 1300. After the end of the above-described processing, the radiation imaging apparatus 1100 is powered off by the user, or automatically transits after displaying an error state for a predetermined time, thereby ending the processing and transiting to the stop state, as in the process of step S5008.

In step S5010, the display unit 1112 of the radiation imaging apparatus 1100 or the PC 1300 notifies that the normal unit is abnormal, and shooting is impossible. After that, the processing is ended by a user operation or automatic transition, as in the process of step S5008 or S5009, and the radiation imaging apparatus transits to the stop state. At this time, log information may be extracted and output to the PC 1300, as in step S5009. In addition, the maintenance unit 1113 may be checked, as in step S5006.

In step S5011, the processing authority is temporarily switched from the first control unit 1101 to the second control unit 1117. That is, if the normal unit check in step S5003 has normally ended, the second control unit 1117 can execute processing.

In step S5012, the second control unit 1117 checks the function of the maintenance unit 1113. In step S5013, the second control unit 1117 determines whether the function check has normally ended. If the check has normally ended, the process advances to step S5018. If the check has not normally ended, the process advances to step S5014. The processes of steps S5012 and S5013 are the same as the processes of steps S5006 to S5007.

In step S5014, the first control unit 1101 determines whether the check of the maintenance unit 1113 has failed in normally ending due to the abnormality of the second control unit 1117. If the second control unit 1117 is abnormal, the process advances to step S5015. If the second control unit 1117 is normal, the process advances to step S5016. In this determination processing, it can be determined that the second control unit 1117 is in an abnormal state, based on a fact that another control unit (in this example, the first control unit 1101) has not yet received a check completion notification to be output from the second control unit 1117, as in the case where it is determined in step S5004 whether the first control unit 1101 is normal. In step S5015, after the elapse of a predetermined time, the processing authority is transferred from the second control unit 1117 to the first control unit 1101.

In step S5016, the user is notified that the maintenance unit 1113 is abnormal. Even when it is determined in step S5014 that the second control unit 1117 is normal, the user is notified in step S5016 that the maintenance unit 1113 is abnormal. The processing unit that executes the notification changes depending on whether the process advances to step S5016 via step S5015. That is, if the process advances via step S5015, since the second control unit 1117 is abnormal, the processing unit that can execute the notification is the first control unit 1101 or a device such as the PC 1300 outside the radiation imaging apparatus 1100. On the other hand, if the process advances without intervention of step S5015, the second control unit 1117 can execute the notification, in addition to these processing units. Note that in step S5016, processing continuation confirmation with the user is performed, in addition to the abnormal state notification. Since the normal unit operates normally, this processing is performed to confirm whether to advance to shooting processing with awareness of the abnormality in the maintenance unit 1113.

In step S5017, a result of determining whether to continue processing is accepted from the user. The user notifies the radiation imaging apparatus 1100 of the processing continuation determination result via the PC 1300 or the operation unit 1111 of the radiation imaging apparatus 1100. If the processing is not to be continued, the processing ends, and the radiation imaging apparatus transits to the stop state. To continue the processing, the process advances to step S5019.

In step S5018, the processing authority is transferred from the second control unit 1117 to the first control unit 1101. In this embodiment, the maintenance unit 1113 is powered off at this time. In step S5019, the radiation imaging apparatus 1100 executes normal shooting processing. The process of step S5018 includes acceptance of the shift to shooting processing, shooting processing using the sensor unit 1104, and post-shooting processing of, for example, transmitting shot image data.

In step S5020, the radiation imaging apparatus 1100 shifts to the standby state before shooting, and determines based on a user input whether to end the processing. If the processing is not to be ended, the process returns to step S5019. Upon accepting an input to the operation unit 1111 or an input to the PC 1300 to shift to the next shooting processing, the processing continues. Upon receiving an input to power off or end the processing, the radiation imaging apparatus 1100 stops and ends the processing.

[Check Processing in Steady State]

Details of check processing in a steady state of the radiation imaging apparatus 1100 in step S4004 will be described with reference to the flowchart of FIG. 16. In this embodiment, the steady state is a state in which the radiation imaging apparatus 1100 is ON and can transit to a shooting enable state upon receiving an instruction to shift to shooting from the PC 1300 or the like. In this embodiment, when the radiation imaging apparatus 1100 is in the steady state, not all the processing units of the maintenance unit 1113 are operating. Instead, each processing unit is standing still in a state in which the second power supply generation unit 1119 can start feed based on an external signal input. If the activation condition of the maintenance unit 1113 is met in this state, the processing shown in FIG. 16 starts. In step S6000, the processing units of the maintenance unit 1113 including the second control unit 1117 are activated. Here, assume a case where the user confirms some failure with the radiation imaging apparatus 1100 in the steady state and operates the operation unit 1111, thereby activating the maintenance unit 1113. Note that the process may be executed periodically using a timer.

Figure 17:
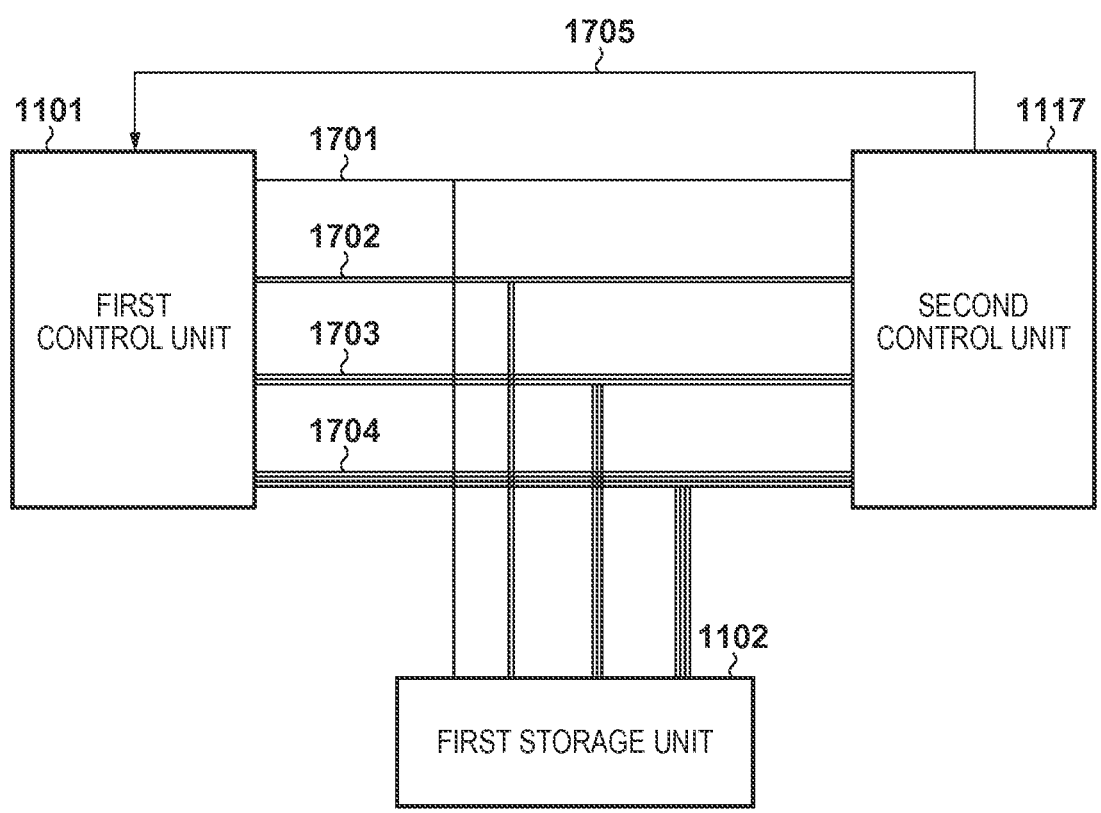
FIG. 17 is a block diagram showing an example of connection between a storage unit and control units according to the third embodiment.

In step S6001, it is confirmed whether access to the first storage unit 1102 of the normal unit is possible. In step S6002, it is determined whether access is possible. If access is possible, the process advances to step S6003. If access is impossible, the process advances to step S6007. The processing of determining whether access is possible will be described with reference to FIG. 17. FIG. 17 shows an example of connection between the first storage unit 1102 and the control units (the first control unit 1101 and the second control unit 1117). A line 1701 is used to obtain the control right of the first storage unit 1102. Each control unit outputs a signal to use the first storage unit to the line 1701. Upon receiving the signal, the first storage unit 1102 becomes usable.

On the other hand, a control unit different from the control unit that has output the signal to the line 1701 can determine that the first storage unit 1102 is being used by another control unit, by reading the line 1701. The control unit that has obtained the control right outputs, to a line 1702, a signal representing which one of read and write processes is to be performed. The control unit exchanges an address in the first storage unit 1102 via a line 1703, and data contents via a line 1704. Based on whether the signal exchange can normally be performed, the control unit that has obtained the control right can determine whether the first storage unit 1102 is normally operating.

A line 1705 is used to accept reset of the first control unit 1101 and connect an output from the second control unit 1117 to the first control unit 1101. By operating the line 1705, the second control unit 1117 can reset the first control unit 1101. Examples in which access is determined to be impossible are a case where the line 1701 (control right obtaining line) shown in FIG. 17 remains used by another processing unit and a case where no reply is received from the first storage unit 1102 even after read or write processing is actually performed.

In step S6003, data stored in the first storage unit 1102 is transferred to the PC 1300 or the like outside the radiation imaging apparatus 1100 via the first communication unit 1105 and the fourth external connection unit 1115. In this embodiment, data transfer is assumed to be data sending to the PC via a wireless relay device by wireless LAN. The range of data to be transferred can comply with a preset range and is not particularly limited. For example, all data stored in the first storage unit 1102 may be transferred, or only stored log information may be transferred.

Alternatively, only log information newly added after the last log information transfer may be extracted and transferred. In this case, it is necessary to internally hold information used to determine whether log information has already been transferred or make a PC or the like to notify the contents of finally received log information or the time of last reception. If an untransferred image remains in the first storage unit 1102, the image may be transferred preferentially, or a notification to confirm with the user whether transfer is possible may be displayed via the PC or the like.

In step S6004, reset of the normal unit side by the maintenance unit 1113 is executed. In this embodiment, the first control unit 1101 and the second control unit 1117 shown in FIG. 12 are connected. The second control unit 1117 thus executes reset of the first control unit 1101 first, and the first control unit 1101 then executes reset of remaining processing units of the normal unit. Note that the reset method is not limited to the above-described method.

For example, the second control unit 1117 may reset the first power supply generation unit 1109 to temporarily block all outputs of the first power supply generation unit 1109, thereby executing reset of the normal unit. Alternatively, the second control unit 1117 may reset each processing unit of the normal unit and sequentially execute reset on a processing unit basis. It is confirmed whether the failure in the normal unit is eliminated by the above-described process of step S6004. This reset processing is executed after the data transfer process of step S6003, thereby preventing data to be extracted from being lost.

In step S6005, the second control unit 1117 confirms the reset result of the normal unit. In this embodiment, the first control unit 1101 and the second control unit 1117 are connected, as described above. Hence, the first control unit 1101 outputs the information of the reset result to the second control unit 1117, thereby performing confirmation. However, the process of step S6005 is not limited to this processing, like the process of step S6004, and the reset result confirmation method can be implemented by a plurality of methods.

In step S6006, the second control unit 1117 transfers the confirmation result of the reset of the normal unit to the PC 1300 or the like. As for the transfer path, if the normal unit has returned to the normal state by reset, the confirmation result may be transferred by the first communication unit 1105 on the normal unit side or the like. On the other hand, if the normal unit has not returned to the normal state by reset, the confirmation result is transferred by the second communication unit 1116 of the maintenance unit 1113 or the like. When transfer is completed, the processing ends. The maintenance unit 1113 shifts to the state before activation, that is, the stop state. Note that in this embodiment, the maintenance unit 1113 automatically shifts to the stop state after completion of transfer. However, the maintenance unit 1113 may wait for a user input and then shift to the stop state.

In step S6007, it is determined whether the first storage unit 1102 is being used. If the first storage unit 1102 is being used, the process advances to step S6008. If the first storage unit 1102 is not being used, the process advances to step S6009. As a detailed example of this determination, a method of determining whether the above-described line 1701 configured to obtain an access right is being used is usable.

In step S6008, the second control unit 1117 resets the first control unit 1101. If it is determined in step S6007 that the first storage unit 1102 is being stored, a failure may have occurred in the first control unit 1101 that may be using the first storage unit 1102, and the control right may be kept reserved. Hence, to obtain the control right of the first storage unit 1102, processing of resetting the first control unit 1101 is executed.

The line that implements this is the line 1705 (reset control line) shown in FIG. 17. By operating the line 1705, the second control unit 1117 can reset the first control unit 1101. Note that the processing units other than the first control unit 1101, for example, the first storage unit 1102 is not reset here. This aims at reducing the possibility that data to be extracted, which may remain in the first storage unit 1102, is lost by reset.

Reset of the first control unit 1101 is assumed to be done by a method of connecting the first control unit 1101 and the second control unit 1117 and causing the second control unit 1117 to output the reset signal of the first control unit 1101, as described concerning the process of step S6004. However, the first power supply generation unit 1109 may be configured to ON/OFF-control its output for each processing unit of supply destination, and only the first control unit 1101 may be reset by the ON/OFF operation. The line from the first control unit 1101 to the first storage unit 1102 may be disconnected by a switch. As described above, the circuit included in the processing unit is connected to as to be able to supply the reset signal to the reset pin of the control unit via the line. The processing unit may supply the reset signal to the reset pin when the determination unit determines that an abnormality has occurred in the control unit, and the control unit has access authority to the storage unit. The processing unit may perform processing of revoking the access authority by stopping power supply to the first control unit 1101. The processing unit may perform processing of revoking the access authority by controlling a switching element configured to switch the connection state between the control unit and the storage unit and setting the control unit and the storage unit in a non-connection state.

Note that if the reset processing of the first control unit 1101 in step S6008 ends, the process returns to step S6002 to determine whether access to the first storage unit 1102 is possible. When the first control unit 1101 continuously holds the control right of the first storage unit 1102 due to a failure, the holding state is canceled by the process of step S6008, and the process advances to processing from step S6003. On the other hand, if a state in which access to the first storage unit 1102 is impossible continues due to another reason, the process advances to step S6007 again. Since the holding of the control right of the first storage unit 1102 by the first control unit 1101 was canceled by the previous process of step S6008, the process advances to step S6009 via step S6007.

Note that even after reset by the process of step S6008, the first control unit 1101 may be reactivated with the control right of the first storage unit 1102 held intact due to a failure in the first control unit 1101 or a failure in a processing unit that outputs a signal to the first control unit 1101. In this case, the processes of steps S6002, S6007, and S6008 may repetitively be executed. Assuming such a case, processing of counting the number of times of reset of the first control unit 1101 may be added before and after step S6008. If the reset count reaches a predetermined count, error determination is performed to end the processing. The processing may be ended after error display is presented to the user. In this way, it may be determined whether the processing of revoking the access authority by the processing unit has succeeded (success/failure determination), and the number of failures of revoking processing may be counted (count). Upon determining that the revoking processing has failed, the processing unit may perform the processing again and output an error if the processing has failed a predetermined number of times (error output).

In a case where a processing unit that may use the first storage unit 1102 exists in addition to the first control unit 1101, before advancing from step S6007 to step S6009, processing of determining whether the processing unit is holding the control right of the first storage unit 1102 and processing of partially resetting the processing unit if it holds the control right may be added, like steps S6007 and S6008.

In step S6009, the second control unit 1117 determines whether power is being supplied from the first power supply generation unit 1109 to the first storage unit 1102. If power is being supplied, the process advances to step S6011. If no power is being supplied, the process advances to step S6010. This determination can be performed by, for example, inputting, to the second control unit 1117, a voltage or current detection result corresponding to the output of the first power supply generation unit 1109. If no power is being supplied, the process advances to step S6010. If power is being supplied, the process advances to step S6011.

In step S6010, the second power supply generation unit 1119 of the maintenance unit 1113 starts supplying power to the first storage unit 1102. This can be implemented by, for example, connecting the output system of the first power supply generation unit 1109 and the output system of the second power supply generation unit 1119 via a switch and causing the second control unit 1117 to ON/OFF-control the switch. Power is thus supplied to the first storage unit 1102. After that, the process returns to step S6002. In this case, since access to the first storage unit 1102 is possible, the process advances to processing from step S6003.

If access to the first storage unit 1102 is still impossible even after the processes of steps S6007 to S6010, the process advances from step S6009 to step S6011.

In step S6011, the display unit 1112 to the PC 1300 notifies the user that access to the first storage unit 1102 is impossible. In this case, the first storage unit 1102 itself or a circuit pattern is assumed to have a failure. After that, the maintenance unit 1113 stops, and the processing ends.

Note that in this embodiment, the activation condition in step S6000 has been described as an operation on the operation unit 1111. However, the condition is not limited to this example. For example, a timer function may be provided in or outside the first control unit 1101. The maintenance unit 1113 may be activated at a predetermined period based on the count result of the timer so as to determine the failure occurrence state of the normal unit and transfer data according to the determination result. Each processing unit of the normal unit may be provided with an information output unit for indicating whether processing is normally performed. The second internal power supply 1118 and the second power supply generation unit 1119 in the maintenance unit 1113 may start feed to the maintenance unit 1113 to start the operation based on the output result of the information output unit.

As described above, the information processing apparatus according to an embodiment of the present invention is an information processing apparatus (200, 1113) that is connected to an external connection unit (107) of a radiation imaging apparatus (100, 1000, 1100) including a storage unit (1102) and a control unit (first control unit 1101) configured to access the storage unit. The information processing apparatus includes a determination unit ("activation condition achievement" in FIG. 16) configured to determine that an abnormality has occurred in the radiation imaging apparatus, a processing unit (1117, 1705, S6008) configured to, in a case where the determination unit determines that the abnormality has occurred, and the control unit has access authority to the storage unit, perform processing of revoking the access authority, another control unit (second control unit 1117) configured to obtain the access authority to the storage unit in accordance with the processing of the processing unit and access the storage unit, and an output unit configured to output, to an external apparatus, at least one of radiation image data captured by the radiation imaging apparatus and log data of the radiation imaging apparatus which are obtained from the storage unit via the other control unit.

[Check Processing During Shooting]

Details of check processing during shooting in step S4010, more specifically, processing executed when a failure has occurred at the time of shooting will be described next with reference to the flowchart of FIG. 18. This procedure starts when the radiation imaging apparatus 1100 already activated starts shooting processing. Processes concerning shooting are executed before advancing to step S8001, but a description thereof will be omitted here.

In step S8001, the first control unit 1101 determines whether shooting has normally ended. Usually, processing concerning shooting is executed cooperatively by the first control unit 1101 and the processing units and ends within a predetermined time. In step S8001, it is confirmed whether shooting processing is not ended even after the elapse of a time in which the processing is expected to end. If shooting has normally ended, the procedure ends. If shooting has not normally ended, the process advances to step S8002.

In step S8002, it is determined whether the first control unit 1101 is normal. If the first control unit 1101 is normal, the process advances to step S8003. If the first control unit 1101 is not normal, the process advances to step SU6000. Whether the first control unit 1101 is normal can be determined by, for example, determining, using a timer, that the sensor driving unit 1103 or the first storage unit 1102 can continuously hold an operation state for a predetermined time or more, or the first communication unit 1105 does not receive a data transfer instruction from the first control unit 1101 even after the elapse of a predetermined time.

The process of step SU6000 has the same contents as those of step SU4001 of FIG. 14 and function check processing upon activation in step SU6000 described with reference to FIG. 16. That is, the maintenance unit 1113 is activated. If access to the first storage unit 1102 is possible, data is output to the outside. If access is impossible, reset of a processing unit that may hold the control right of the first storage unit 1102 or power supply to the first storage unit 1102 is executed. If access to the first storage unit 1102 is still impossible, it is determined that the first storage unit 1102 has a failure, and the processing ends.

In step S8003, the first control unit 1101 determines whether the output system of the first communication unit 1105 is normal. More specifically, whether the output system is normal can be determined by confirming whether a response to processing that the first control unit 1101 has requested the first communication unit 1105 to do exists. If the output system is normal, the process advances to step S8007. If the output system is not normal, the process advances to step S8004.

In step S8004, the first control unit 1101 controls the second power supply generation unit 1119 to activate the maintenance unit 1113. In step S8005, the second control unit 1117 outputs data in the first storage unit 1102 to the outside using the processing units in the maintenance unit 1113.

In step S8006, the maintenance unit 1113 stops, and after that, the processing ends. Note that in the example shown in FIG. 18, the maintenance unit 1113 is assumed to normally operate. However, operation confirmation may be executed as in function check processing upon activation described with reference to FIGS. 15A and 15B.

In step S8007, the first control unit 1101 outputs data such as a log to the PC 1300 outside the radiation imaging apparatus 1100 via the first communication unit 1105. After the output, the processing ends.

Note that an example has been described above in which it is determined in the process of step S8003 whether the output system including the first communication unit 1105 is normal. However, the determination content is not limited to this, and any other determination method is usable as long as it can be determined whether information output via the first communication unit 1105 is possible. For example, it may be confirmed whether another processing unit, for example, a processing unit of the shooting system such as the sensor driving unit 1103 is normal, thereby determining whether shooting has failed in normally ending due to a failure in the first communication unit 1105 or a failure in another processing unit. Alternatively, the state of the first communication unit 1105 may be derived by confirming whether a plurality of processing units are normal to cope with a case where failures occur in a plurality of portions.

Figure 18:
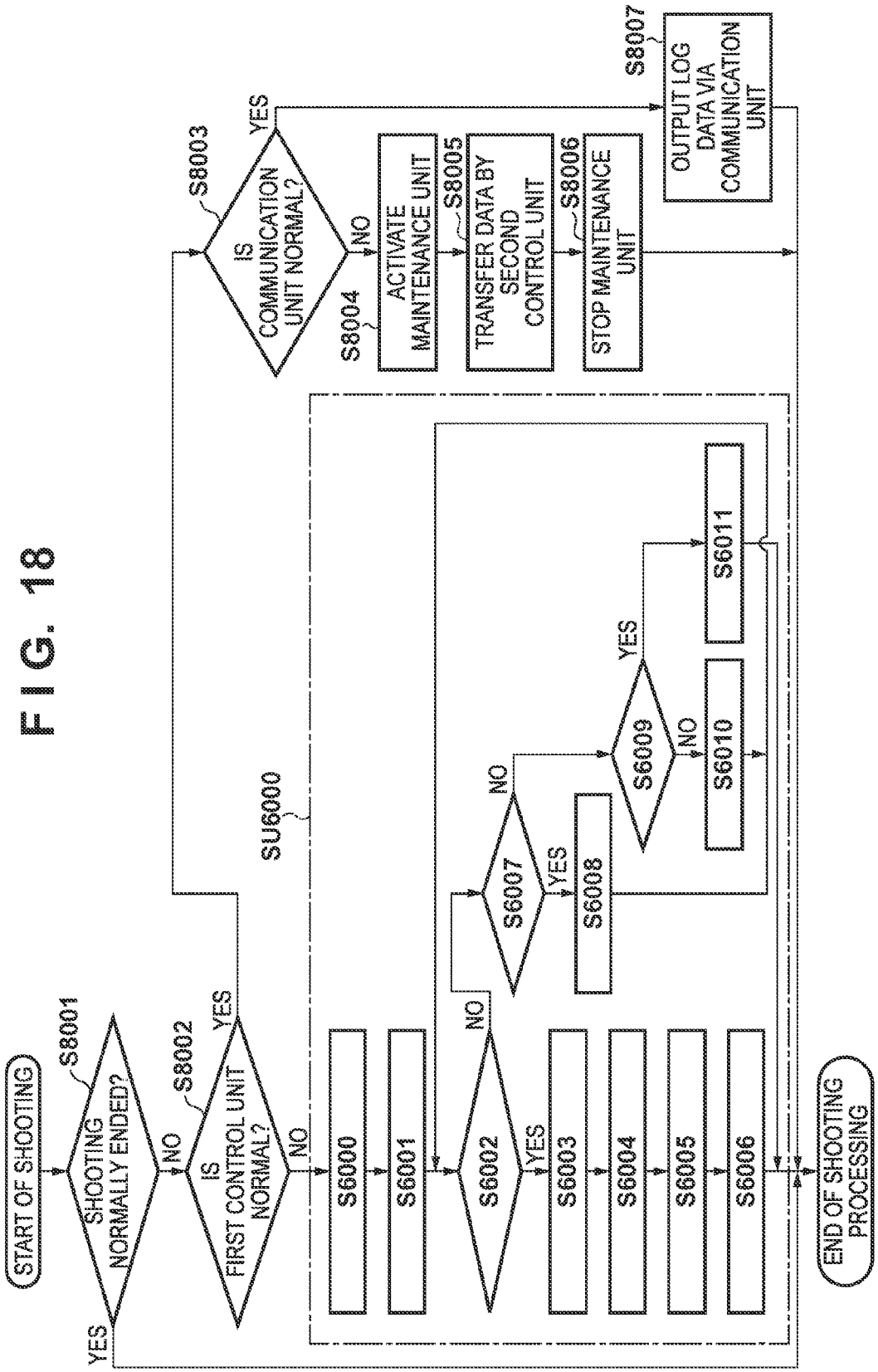
FIG. 18 is a flowchart showing the procedure of check processing during shooting executed by the radiation imaging apparatus according to the third embodiment.

In the check processing during shooting shown in FIG. 18, an example in which the maintenance unit 1113 is activated after detection of an abnormality has been described. However, the procedure is not limited to this example. If a failure may occur during shooting, the maintenance unit 1113 may be activated at the same time as the start of shooting processing. This can more reliably prevent occurrence of a situation in which important shot image information cannot be extracted.

Figure 19:
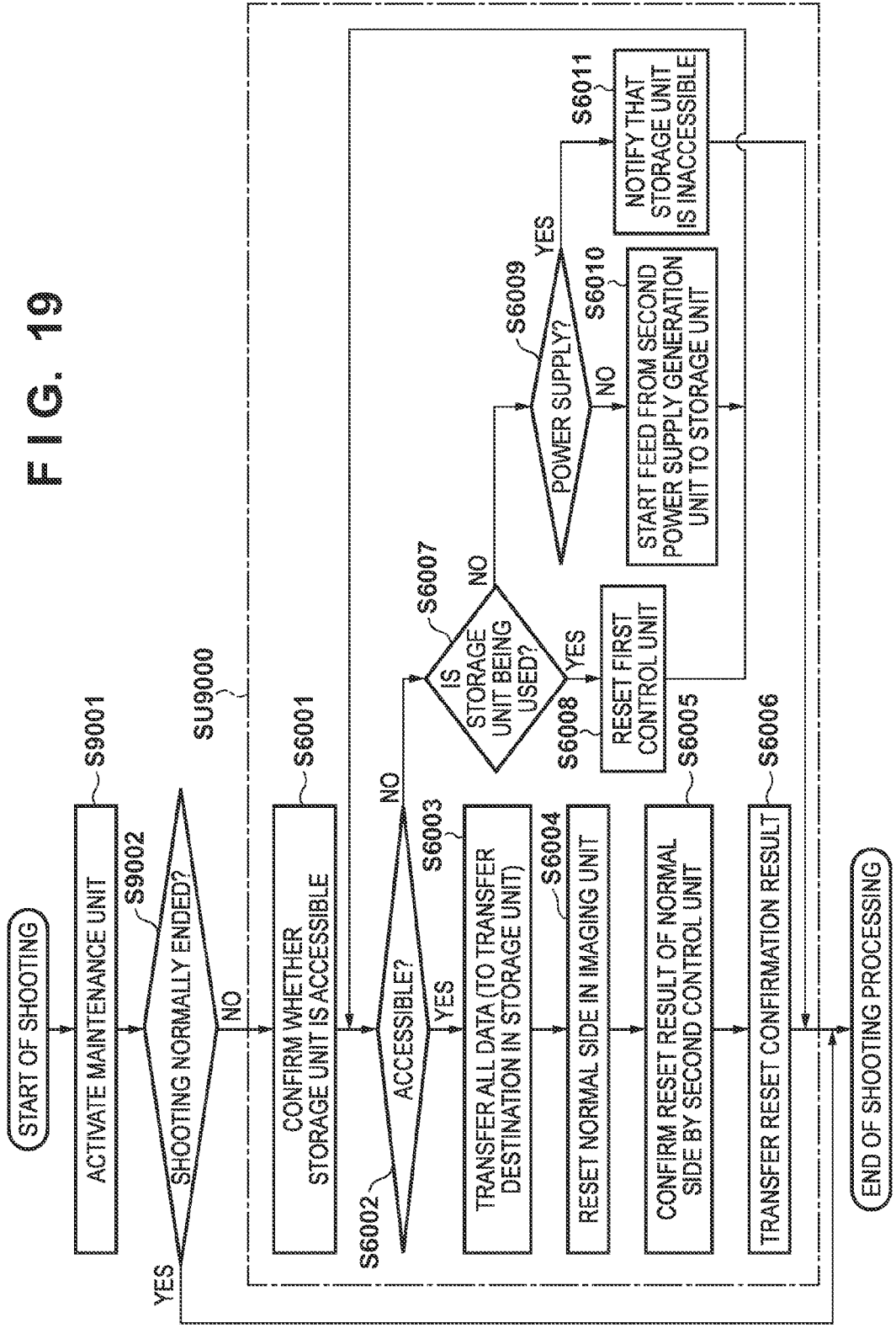
FIG. 19 is a flowchart showing the procedure of check processing during shooting when the radiation imaging apparatus according to the third embodiment activates the maintenance unit at the same time as starting shooting processing.

A processing procedure when activating the maintenance unit 1113 at the same time as the start of shooting processing will be described below with reference to the flowchart of FIG. 19.

When shooting starts, the maintenance unit 1113 is activated in step S9001. In step S9002, processing of determining whether shooting has normally ended is performed, as in the flowchart of FIG. 18. However, the determination processing can also be executed by the second control unit 1117, unlike FIG. 18. For example, when the second control unit 1117 performs the determination, result information may be obtained for the first control unit 1101, or the second control unit 1117 may be connected to the processing units in the normal unit and monitor the state of each processing unit. If shooting has normally ended, the processing ends. If shooting has not normally ended, the process advances to step SU9000.

The process of step SU9000 corresponds to the processing SU6000 in FIGS. 16 and 18 in which function check processing upon activation S6000 of the maintenance unit 1113 is omitted. In the example shown in FIG. 19, to transfer data using the maintenance unit 1113 that has already been activated at the time of failure occurrence, if shooting has not normally ended in step S9002, the process directly advances to processing of confirming accessibility to the storage unit, which is the first process of step SU9000.

However, the procedure is not limited to this example. Like the processes of steps S8002 to S8007 shown in FIG. 18, processing of determining a portion in an abnormal state, and if an operation is possible, outputting data using the first communication unit 1105 or the like may be performed. The process of step SU9000 is the same as the process of step SU6000 except step S6000, and a description thereof will be omitted.

According to this embodiment, even if a failure occurs in the radiation imaging apparatus, and information cannot be output via the first output system used in a normal operation, information can be output to the outside using the second output system. This makes it possible to shorten the time necessary to extract information to be used for failure analysis from the radiation imaging apparatus at the time of failure occurrence. Additionally, even if a failure occurs before an image finally shot is completely output from the radiation imaging apparatus, the possibility that data can be extracted using the second output system can be raised.

Even in a case where a failure occurs in the first control unit that is normally used, and another processing unit that normally operates is occupied due to the influence, it is possible to obtain the control right from the first control unit and release the processing unit from the occupied state.

Fourth Embodiment

In the third embodiment, the arrangements of the radiation imaging apparatus 1100 and the maintenance unit 1113 provided in it have been described. The number of functions to be provided in the maintenance unit 1113 to cope with a failure changes depending on the condition.

For example, the possibility of failure occurrence is assumed to be high in a processing unit that operates many times/for a long time. In addition, the connection portion between the radiation imaging apparatus and another device using a connector is assumed to be worn. Such a risk corresponding to a use state is assumed, a function to be provided in the maintenance unit 1113 can be set only for a processing unit that is probably needed.

Figure 20:
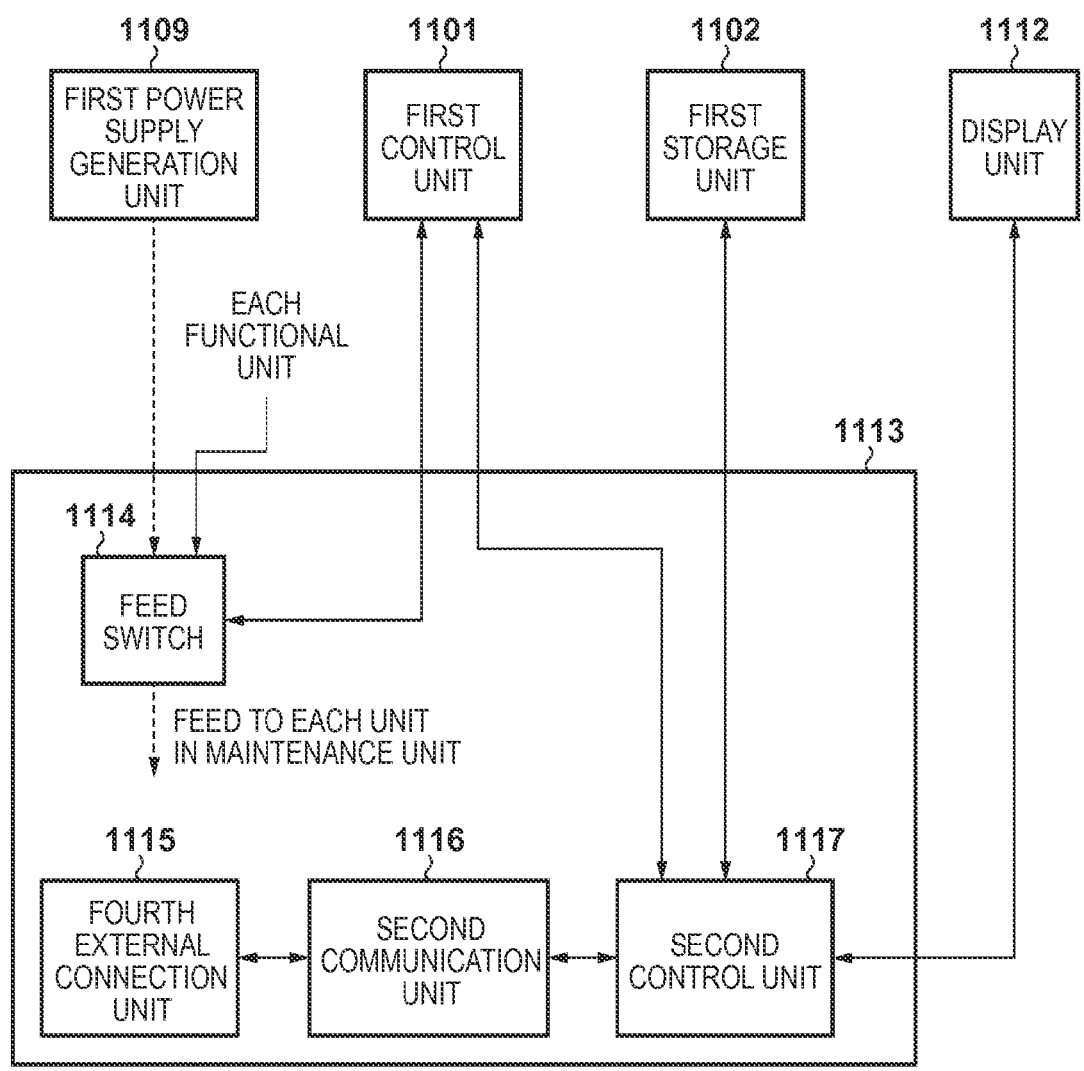
FIG. 20 is a block diagram showing an example of the arrangement of a maintenance unit according to the fourth embodiment and the relationship between the maintenance unit and peripheral processing units.

FIG. 20 is a block diagram showing an example of the arrangement of a maintenance unit 1113 in a case where the risk of failure occurrence in a first communication unit 1105 and a first control unit 1101 is high and the relationship between the maintenance unit 1113 and peripheral processing units. The number of processing units of the maintenance unit 1113 is smaller in FIG. 20 than in FIG. 12 of the third embodiment. For example, since it is determined that the failure risk of the first power supply generation unit 1109 is not high, the power supply of the first power supply generation unit 1109 is shared, and the second internal power supply 1118 and the second power supply generation unit 1119 are thus omitted.

On the other hand, a feed switch 1114 is added, as compared to FIG. 12. The feed switch 1114 is a switch function for controlling whether to connect the first power supply generation unit 1109 to the processing units of the maintenance unit 1113.

[Function Check Processing Upon Activation]

Details of function check processing upon activation executed by a radiation imaging apparatus 1100 according to this embodiment will be described below. Function check processing upon activation according to this embodiment is almost the same as the processing of the flowchart of FIGS. 15A and 15B. Hence, different points will mainly be explained with reference to FIGS. 15A and 15B.

In step S5001, feed to the maintenance unit 1113 is started by an input to an operation unit 1111, and the feed switch 1114 is switched to an ON state (connection state) at the same time as the start of output of the first power supply generation unit 1109. This operation is performed by the first control unit 1101. Alternatively, the feed switch 1114 may change to the ON state upon receiving information directly input based on the input to the operation unit 1111. Feed may start only when the operation of the maintenance unit 1113 is needed.

In subsequent processes where the processing authority is transferred from a second control unit 1117 to the first control unit 1101, as in steps S5005, S5015, and S5018, feed to the maintenance unit 1113 may be stopped by operating the feed switch 1114 at the same time as the authority transfer.

[Check Processing in Steady State]

Figure 21:
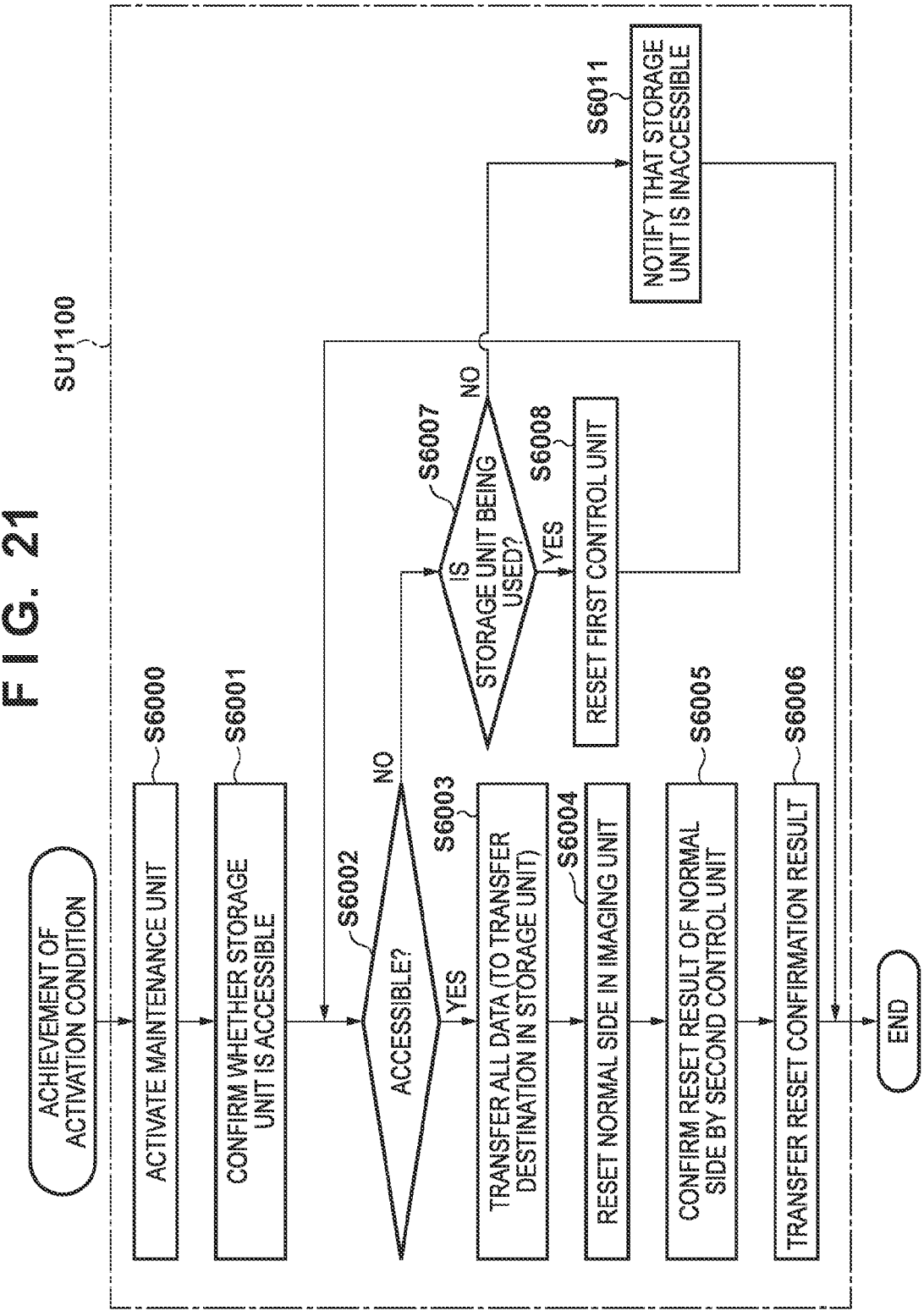
FIG. 21 is a flowchart showing the procedure of check processing in a steady state executed by a radiation imaging apparatus according to the fourth embodiment.

Details of check processing in a steady state executed by the radiation imaging apparatus 1100 according to this embodiment will be described next with reference to the flowchart of FIG. 21. Check processing in the steady state according to this embodiment is almost the same as the processing of the flowchart of FIG. 16. A series of processes SU1100 shown in FIG. 21 corresponds to the processing shown in FIG. 16 in which the processes of steps S6009 and S6010 concerning the second power supply generation unit 1119 are omitted.

[Check Processing During Shooting]

Check processing during shooting executed by the radiation imaging apparatus 1100 according to this embodiment will be described next. Check processing during shooting according to this embodiment corresponds to a processing procedure obtained by omitting the processes of steps S6009 and S6010 (processes concerning power supply to a first storage unit 1102) in step SU6000 or SU9000 (see FIG. 16 for details of the processes) described with reference to FIG. 18 or 19. For example, step SU6000 shown in FIG. 18 is replaced with step SU1100 shown in FIG. 21. Contents of processes other than the replaced process are the same as in the third embodiment.

Fifth Embodiment

In the fifth embodiment, a radiation imaging apparatus includes a second storage unit 1120 (to be described later with reference to FIGS. 22 and 23) in addition to a first storage unit 1102, and log information of an operation is stored in the two storage units. In a maintenance unit 1113, a second control unit 1117 is configured to access the two storage units. For example, an arrangement in which another set of lines 701 to 704 in FIG. 17 is prepared to connect the second storage unit 1120 to the control units is considerable.

Figure 22:
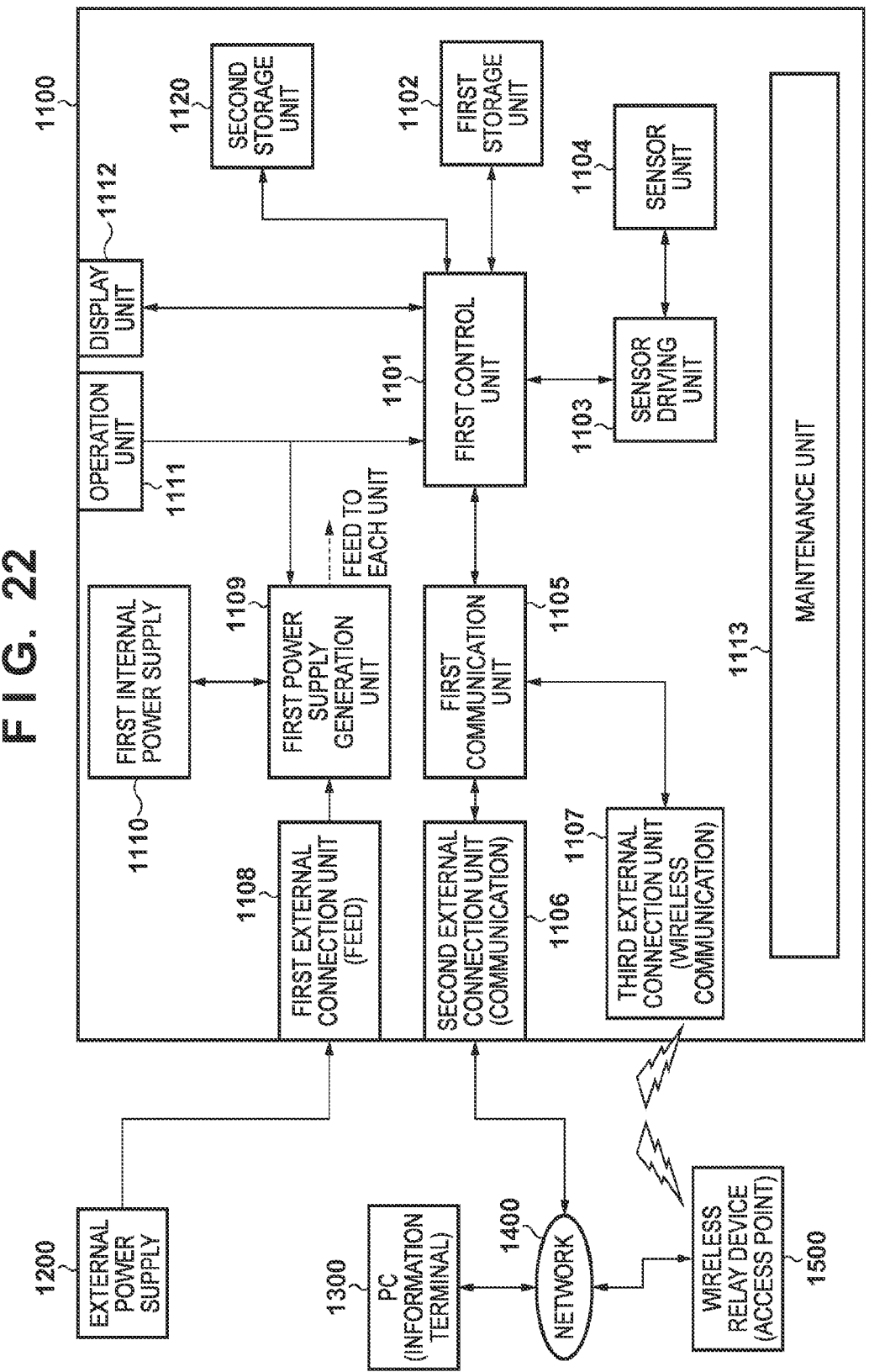
FIG. 22 is a block diagram showing an example of the arrangement of a radiation imaging apparatus according to the fifth embodiment.
Figure 23:
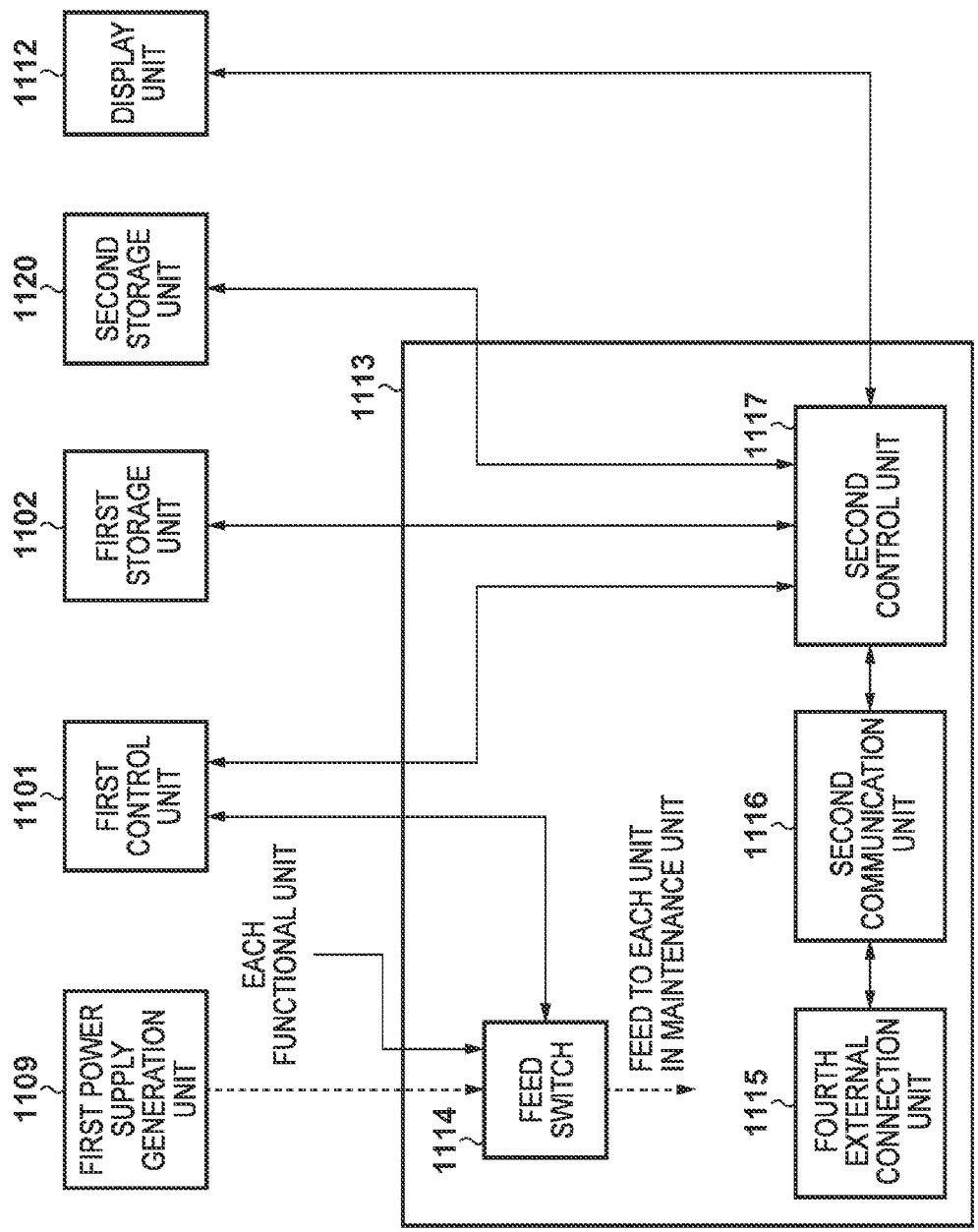
FIG. 23 is a block diagram showing an example of the arrangement of a maintenance unit according to the fifth embodiment.

FIG. 22 is a block diagram showing an example of the arrangement of a radiation imaging apparatus 1100 according to this embodiment corresponding to FIG. 11. FIG. 23 is a block diagram showing the arrangement of the maintenance unit 1113 according to this embodiment and the relationship between the maintenance unit 1113 and peripheral processing units corresponding to FIG. 12. Although the fourth embodiment will be quoted here, the base is not particularly limited and may be the third embodiment.

According to the arrangement of this embodiment, in a case where the second control unit 1117 is going to output data to the outside at the time of failure occurrence, even if a first control unit 1101 holds the control right due to a failure, and access to one storage unit is impossible, the data can be extracted by accessing to the other storage unit without the necessity of executing processing such as reactivation of the first control unit 1101.

[Check Processing in Steady State]

Figure 24:
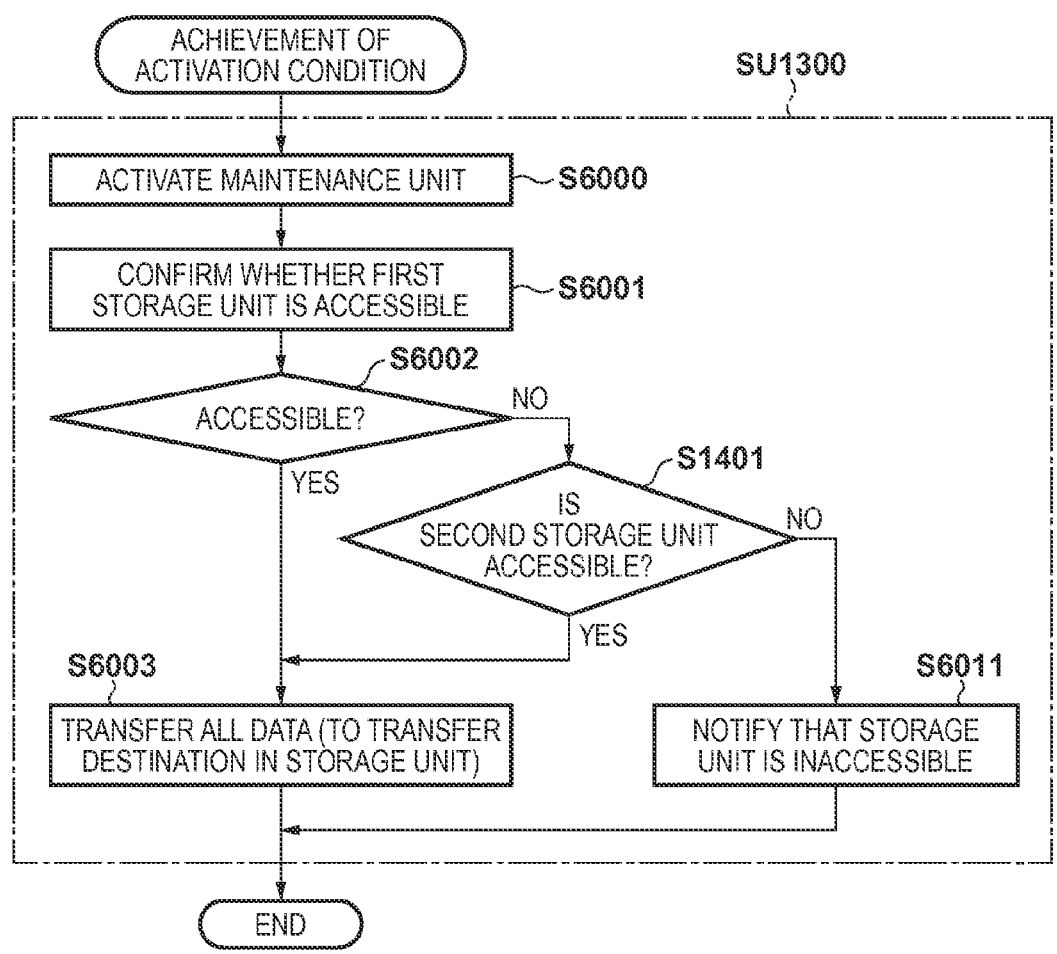
FIG. 24 is a flowchart showing the procedure of check processing in a steady state executed by the radiation imaging apparatus according to the fifth embodiment.

Check processing in a steady state executed by the radiation imaging apparatus 1100 according to this embodiment will be described below with reference to the flowchart of FIG. 24. A series of processes SU1300 shown in FIG. 24 corresponds to step SU6000 shown in FIG. 16 or step SU1100 shown in FIG. 21, which is partially modified, and different points will mainly be explained below.

In step S6000, the maintenance unit 1113 is activated. In step S6001, it is confirmed whether the second control unit 1117 can access a predetermined storage unit (here, the first storage unit 1102). Upon determining in step S6002 that access is possible, the process advances to step S6003. Upon determining in step S6002 that access is impossible, the process advances to step S1401.

In step S1401, it is determined whether access to the second storage unit 1120 is possible. If access is possible, the process advances to step S6003. If access is impossible, the process advances to step S6011.

In step S6003, data stored in the storage unit (the first storage unit 1102 or the second storage unit 1120) is transferred to a PC 1300 or the like outside the radiation imaging apparatus 1100.

In this embodiment, since the fourth embodiment is quoted, power supply reset is not performed. The first storage unit 1102 and the second storage unit 1120 are configured based on an assumption that even when a failure occurs in the first control unit 1101 that holds the control right of one storage unit, access to the other storage unit is possible. Hence, reactivation of the first control unit 1101 is not executed. Note that the arrangement is not limited to these embodiments.

Sixth Embodiment

In the sixth embodiment, a radiation imaging apparatus that operates in a mode (to be referred to as a moving image mode hereinafter) for providing a moving image by continuously shooting images will be described.

The arrangement of the radiation imaging apparatus according to this embodiment is the same as in FIGS. 11 and 12 described in the third embodiment. Process contents (function check processing upon activation and check processing in a steady state) are also the same. Check processing during shooting performed when shooting a still image is also the same as in the third embodiment.

Figure 25:
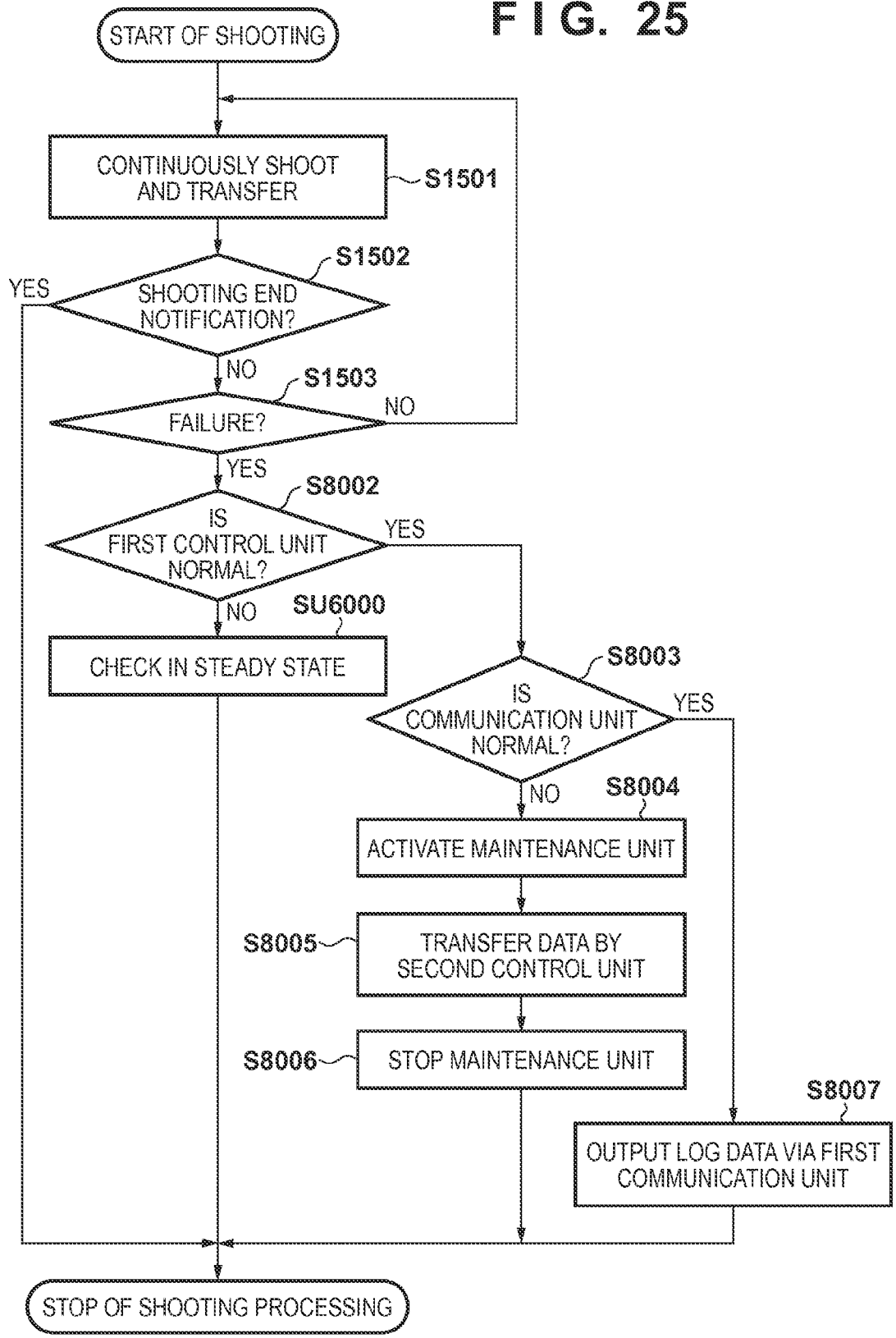
FIG. 25 is a flowchart showing the procedure of check processing during shooting in a moving image mode executed by a radiation imaging apparatus according to the sixth embodiment.

Check processing during shooting in the moving image mode, which is different from the third embodiment, will be described below with reference to the flowchart of FIG. 25. At the time of shooting in the moving image mode, since continuous image reproduction and transfer are continued, the communication path of image transfer using a first communication unit 1105 is occupied. Hence, processing of activating a maintenance unit 1113 changes. When shooting starts, continuous image shooting processing and transfer processing are started in step S1501.

In step S1502, it is determined whether a shooting end notification exists. If a shooting end notification exists, the processing ends. If a shooting end notification does not exist, the process advances to step S1503. The timing to stop shooting may be notified in advance at the input timing of a shooting start instruction. Alternatively, a time to receive information from a PC 1300 or the like may be ensured during an interval of image transfer, and information about the stop timing may be received from the PC 1300 or the like during this time. In this embodiment, an example in which the stop timing is received in each image transfer, as in the latter case, is assumed.

In step S1503, the presence/absence of a failure is determined. As the failure determination, the same determination as the contents of the above-described embodiments, for example, a method of determining whether a first control unit 1101 is normal, as in step S8002 shown in FIG. 18 of the third embodiment, is possible. In addition to the stop timing notification information received in each image transfer, a notification representing that transfer is not being performed normally may be transferred from the PC 1300, and determination may be done based on the notification. Reversely, a notification representing that transfer is being performed normally may be sent from the PC 1300 in each transfer, and it may be determined that a failure has occurred when the notification to the radiation imaging apparatus 1100 has stopped. If a failure exists, the process advances to step S8002. If a failure does not exist, the process returns to step S1501.

All processes from step S8002 have the same contents as the corresponding processes in the flowchart of FIG. 18. Log information or data that is untransferred after last shooting can thus be output to the outside.

Seventh Embodiment

In the third to sixth embodiments, a method of transferring data using wireless LAN when transferring data in the first storage unit 1102 from the maintenance unit 1113 to the outside has been described. In this embodiment, however, a method of transferring data to a portable information device terminal using short distance wireless communication will be described.

The arrangements of a radiation imaging apparatus 1100 and a maintenance unit 1113 according to this embodiment are the same as in FIGS. 11 and 12 described in the third embodiment except that a fourth external connection unit 1115 shown in FIG. 12 is replaced with an interface for short distance wireless communication in this embodiment.

Processing according to this embodiment is almost the same as the processing according to the third embodiment except the contents of data transfer processing using the maintenance unit 1113. More specifically, the process contents of step S6003 out of step SU6000 shown in FIG. 16 are replaced with process contents shown in FIG. 26.

Figure 26:
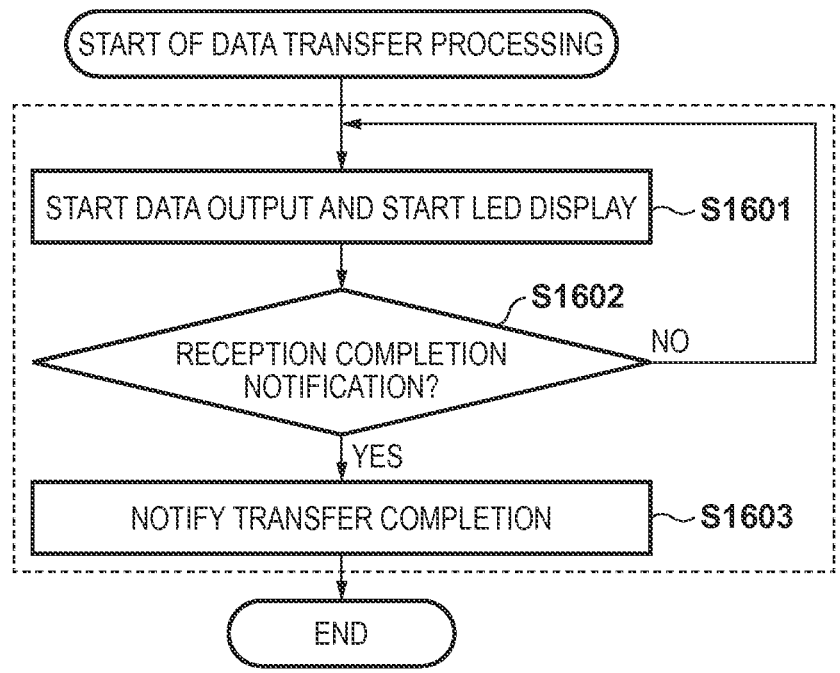
FIG. 26 is a flowchart showing the procedure of processing of transferring data to a portable information device terminal using short distance wireless communication, which is executed by the radiation imaging apparatus according to the sixth embodiment.

In step S1601 of FIG. 26, data output to the outside via the fourth external connection unit 1115 starts. At the same time as the data output, the user is notified, via a display unit 1112, that data is currently being output.

When the portable information device terminal having a reception function and set in a reception mode is moved close to the fourth external connection unit 1115 during the data output, data reception starts. If the reception has successfully ended, the portable information device terminal notifies a reception completion signal to the maintenance unit 1113 via the fourth external connection unit 1115. After the end of the process of step S1601, the maintenance unit 1113 advances to step S1602 and shifts to a state to wait for the reception completion notification from the portable information device terminal.

In step S1602, it is determined whether the reception completion notification is received from the portable information device terminal. If the reception completion notification is received, the process advances to step S1603. If the reception completion notification is not received, the process returns to step S1601.

In step S1603, the user is notified via the display unit 1112 that the transfer processing is completed. Note that if no reception completion signal is received, the process returns to step S1601 to resume data output. However, for example, if reception is not completed even after the processing is executed a predetermined number of times, the process may forcibly advance to step S1603. This processing is also applicable to other data transfer processing from the maintenance unit 1113.

It is therefore possible to transmit data not only to a device having an established communication relationship from the beginning such as the PC 1300 in the system configuration shown in FIG. 11 but also to, for example, a portable information device terminal held by the user and ensure the data.

In this embodiment, the fourth external connection unit 1115 of the third embodiment is replaced with a component for short distance wireless communication. However, the interface for short distance wireless communication may further be provided as a fifth external connection unit in addition to the fourth external connection unit 1115 of the third embodiment.

Eighth Embodiment

In the above-described embodiments, if failure occurrence during shooting is detected, and access to the first storage unit 1102 is possible at this time, processing of transferring data in the first storage unit 1102 is executed.

In this embodiment, in each transfer processing at the time of failure occurrence during shooting, if image data that is shot immediately before and untransferred exists, this image data is preferentially transferred.

This makes it possible to preferentially ensure data of great influence when lost in a case where a failure that has occurred is serious, and the possibility of continuously ensuring a state in which data can be extracted from a first storage unit 1102 lowers.

As described above, the maintenance apparatus is a separate apparatus in the first and second embodiments or an integrated redundant system in the third to eighth embodiments. If the maintenance apparatus is a separate apparatus, the power supply or control unit is switched using connection of the maintenance apparatus as a trigger. Power is supplied upon connection, and bus switching is triggered by the power supply. If the maintenance apparatus is a redundant system, the mode is switched to the maintenance mode in accordance with information of an internal failure or reception of a signal from outside. The separate maintenance apparatus may be one unit incorporated in the radiation imaging apparatus. Even in case of a separate apparatus, the mode may be switched to the maintenance mode in accordance with occurrence of both events, that is, connection of the maintenance apparatus and determination of internal failure occurrence. This can prevent a situation in which the maintenance mode is set in accordance with connection of the maintenance apparatus even without a failure.

According to the present invention, it is possible to, even in a case where some functions such as a control unit of a radiation imaging apparatus have failed, extract desired data from the radiation imaging apparatus in which the failure has occurred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178503, filed Sep. 2, 2014, which is hereby incorporated by reference wherein in its entirety.

What is claimed is:

1. An information processing apparatus connected to an external connection unit of a radiation imaging apparatus including a storage unit and an imaging-apparatus control unit configured to access the storage unit, comprising:
   second control unit that is capable of accessing the storage unit; and
   an output unit configured to output, to an external apparatus, at least one of radiation image data captured by the radiation imaging apparatus and log data of the radiation imaging apparatus which are obtained from the storage unit via the second control unit;
   wherein in a case in which it is determined by the imaging-apparatus control unit or the second control unit that an abnormality has occurred in the radiation imaging apparatus, the second control unit accesses the storage unit.

2. The apparatus according to claim 1, wherein the second control unit includes a circuit that is connected so as to be able to supply a reset signal to a reset pin of the control unit via a line, and
   in the case in which the second control unit determines that it is impossible to access the storage unit by the imaging-apparatus control unit accessing the storage unit, the second control unit supplies the reset signal to the reset pin and resets the access to the storage unit by the imaging-apparatus control unit.

3. The apparatus according to claim 1, wherein the second control unit performs the processing of resetting the access to the storage unit by the imaging-apparatus control unit by stopping power supply to the first control unit, in the case in which the second control unit determines that it is impossible to access the storage unit by the imaging-apparatus control unit accessing the storage unit.

4. The apparatus according to claim 1, wherein the second control unit performs the processing of resetting the access to the storage unit by the imaging-apparatus control unit by controlling a switching element configured to switch a connection state of a line between the imaging-apparatus control unit and the storage unit and setting the control unit and the storage unit in a non-connection state, in the case in which the second control unit determines that it is impossible to access the storage unit by the imaging-apparatus control unit accessing the storage unit.

5. The apparatus according to claim 2, further comprising:
   a success/failure determination unit configured to determine whether the processing of resetting the access to the storage unit by the imaging-apparatus control unit has succeeded; and
   a count unit configured to count the number of failures of the processing,
   wherein upon determining that the processing has failed, the second control unit performs the processing again, and
   wherein the apparatus further comprises an error output unit configured to output an error if the processing has failed a predetermined number of times.

6. A control method of an information processing apparatus connected to an external connection unit of a radiation imaging apparatus including a storage unit, and an imaging-apparatus control unit configured to access to the storage unit, wherein the information processing apparatus comprises a second control unit that is capable of accessing the storage unit, the control method comprising:
   a determination step of determining that an abnormality has occurred in the radiation imaging apparatus by the imaging-apparatus control unit or the second control unit;

a step of causing the second control unit to access the storage unit in a case where it is determined in the determination step that the abnormality has occurred; and an output step of outputting, to an external apparatus, at least one of radiation image data captured by the radiation imaging apparatus and log data of the radiation imaging apparatus which are obtained from the storage unit via the second control unit.

7. A non-transitory computer-readable storage medium storing a computer program for causing a computer to execute the steps of a control method of an information processing apparatus connected to an external connection unit of a radiation imaging apparatus including a storage unit, an imaging-apparatus control unit configured to access to the storage unit, wherein the information processing apparatus comprises a second control unit that is capable of accessing the storage unit, the control method comprising:

a determination step of determining that an abnormality has occurred in the radiation imaging apparatus by the imaging-apparatus control unit or the second control unit;

a step of causing the second control unit to access the storage unit in a case in which it is determined in the determination step that the abnormality has occurred; and an output step of outputting, to an external apparatus, at least one of radiation image data captured by the radiation imaging apparatus and log data of the radiation imaging apparatus which are obtained from the storage unit via the second control unit.

8. A radiation imaging system including an information processing apparatus connected to an external connection unit of a radiation imaging apparatus including a storage unit and an imaging-apparatus control unit configured to access to the storage unit, comprising:

second control unit that is capable of accessing the storage unit; and an output unit configured to output, to an external apparatus, at least one of radiation image data captured by the radiation imaging apparatus and log data of the radiation imaging apparatus which are obtained from the storage unit via the second control unit, wherein in a case in which it is determined by the imaging-apparatus control unit or the second control unit that an abnormality has occurred in the radiation imaging apparatus, the second control unit accesses the storage unit.

9. The apparatus according to claim 3, further comprising:

a success/failure determination unit configured to determine whether the processing of resetting the access to the storage unit by the imaging-apparatus control unit has succeeded; and a count unit configured to count the number of failures of the processing, wherein upon determining that the processing has failed, the second control unit performs the processing again, and the apparatus further comprises an error output unit configured to output an error if the processing has failed a predetermined number of times.

10. The apparatus according to claim 4, further comprising:

a success/failure determination unit configured to determine whether the processing of resetting the access to the storage unit by the imaging-apparatus control unit has succeeded; and a count unit configured to count the number of failures of the processing, wherein upon determining that the processing has failed, the second control unit performs the processing again, and the apparatus further comprises an error output unit configured to output an error if the processing has failed a predetermined number of times.

* * * * *